(12) United States Patent
Sakamoto et al.

(10) Patent No.: US 9,808,964 B2
(45) Date of Patent: Nov. 7, 2017

(54) POROUS SOL GELS AND METHODS AND STRUCTURES RELATED THERETO

(75) Inventors: Jeffrey Sakamoto, East Lansing, MI (US); Ryan Patrick Maloney, East Lansing, MI (US); Travis Thompson, Apple Valley, CA (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 683 days.

(21) Appl. No.: 14/131,821

(22) PCT Filed: Jul. 12, 2012

(86) PCT No.: PCT/US2012/046469
§ 371 (c)(1),
(2), (4) Date: Jan. 9, 2014

(87) PCT Pub. No.: WO2013/009984
PCT Pub. Date: Jan. 17, 2013

(65) Prior Publication Data
US 2014/0170350 A1    Jun. 19, 2014

Related U.S. Application Data

(60) Provisional application No. 61/506,730, filed on Jul. 12, 2011.

(51) Int. Cl.
*B01J 35/10* (2006.01)
*B29C 39/00* (2006.01)
(Continued)

(52) U.S. Cl.
CPC ............ *B29C 39/003* (2013.01); *B01J 21/08* (2013.01); *B01J 35/10* (2013.01); *B01J 35/1019* (2013.01);
(Continued)

(58) Field of Classification Search
CPC ...................................................... B29C 67/20
(Continued)

(56) References Cited

U.S. PATENT DOCUMENTS 7,282,295 B2    10/2007    Visco et al.
7,399,439 B2 *    7/2008    Lee ..................... B01J 13/0091
                                                        264/212

(Continued)

FOREIGN PATENT DOCUMENTS

JP      H0551277 A1     3/1993
JP      6-219726 A      8/1994
JP      200225286       9/2002

OTHER PUBLICATIONS

European Search Report received for EP Application No. 12811695.1-1371, mailed on Jan. 28, 2016, 10 pages.
(Continued)

*Primary Examiner* — Christina Johnson
*Assistant Examiner* — Xue Liu
(74) *Attorney, Agent, or Firm* — Clark IP Law, PLC

(57) ABSTRACT

A method of forming a porous sol gel, including a dried porous sol gel, is provided comprising forming a sol gel from a sol gel-forming composition comprising a silane solution and a catalyst solution; and non-supercritically drying the sol gel to provide a dried porous sol gel having no springback. The dried porous sol gel can include dried macroporous or mesoporous sol gels or dried hybrid aerogels. The materials may contain open or filled pores. Such materials are useful as thermal insulators.

21 Claims, 21 Drawing Sheets

(51) Int. Cl.

| | | |
|---|---|---|
| *C01B 33/158* | (2006.01) | |
| *B01J 37/03* | (2006.01) | |
| *B01J 21/08* | (2006.01) | |
| *C01B 33/145* | (2006.01) | |
| *C01B 33/155* | (2006.01) | |
| *E04B 1/78* | (2006.01) | |
| *C04B 38/00* | (2006.01) | |
| *C04B 35/14* | (2006.01) | |
| *C04B 35/624* | (2006.01) | |
| *C04B 35/626* | (2006.01) | |
| *B01J 35/00* | (2006.01) | |
| *B01J 37/00* | (2006.01) | |

(52) U.S. Cl.
CPC ....... *B01J 35/1061* (2013.01); *B01J 35/1076* (2013.01); *B01J 37/036* (2013.01); *C01B 33/145* (2013.01); *C01B 33/155* (2013.01); *C01B 33/158* (2013.01); *C04B 35/14* (2013.01); *C04B 35/624* (2013.01); *C04B 35/6265* (2013.01); *C04B 35/62655* (2013.01); *C04B 38/0045* (2013.01); *E04B 1/78* (2013.01); *B01J 35/002* (2013.01); *B01J 37/0009* (2013.01); *C04B 2235/3232* (2013.01); *C04B 2235/3418* (2013.01); *C04B 2235/441* (2013.01); *C04B 2235/483* (2013.01); *C04B 2235/5216* (2013.01); *C04B 2235/5232* (2013.01); *C04B 2235/5236* (2013.01); *C04B 2235/5409* (2013.01); *C04B 2235/5436* (2013.01); *C04B 2235/606* (2013.01); *C04B 2235/6023* (2013.01); *Y10T 428/1376* (2015.01); *Y10T 428/249921* (2015.04)

(58) Field of Classification Search
USPC .................................................. 264/41, 49
See application file for complete search history.

(56) References Cited

U.S. PATENT DOCUMENTS

| 9,093,717 | B2 | 7/2015 | Sakamoto et al. | |
|---|---|---|---|---|
| 2004/0033309 | A1* | 2/2004 | Fardad ............... | G02B 6/12004 427/162 |
| 2004/0099843 | A1 | 5/2004 | Costa et al. | |
| 2006/0054487 | A1 | 3/2006 | Risen, Jr. et al. | |
| 2007/0082190 | A1 | 4/2007 | Endres et al. | |
| 2007/0167534 | A1 | 7/2007 | Coronado et al. | |
| 2009/0303660 | A1 | 12/2009 | Nair et al. | |
| 2010/0047696 | A1 | 2/2010 | Yoshida et al. | |
| 2010/0203383 | A1 | 8/2010 | Weppner | |
| 2011/0053001 | A1 | 3/2011 | Babic et al. | |
| 2011/0053002 | A1 | 3/2011 | Yamamura et al. | |
| 2013/0344416 | A1 | 12/2013 | Sakamoto et al. | |

OTHER PUBLICATIONS

European Search Report received for EP Application No. 12811695. 1-1371, mailed on Sep. 18, 2015, 6 pages.
Non Final Office Action received for U.S. Appl. No. 13/476,843, mailed on Dec. 31, 2014, 8 pages.
Non Final Office Action received for U.S. Appl. No. 13/476,843, mailed on Jul. 17, 2014, 9 pages.
Janani et al., "Synthesis of Cubic Li7La3Zr2O12 by Modified Sol-Gel Process", Ionics, vol. 17, No. 7, 2011, 6 pages.
Kokal et al., "Sol-gel Synthesis and Lithium Ion Conductivity of Li7La3Zr2O12 with Garnet-related Type Structure", Solid State Ionics, vol. 185, No. 1, 2011, pp. 1-5.
Kotobuki et al., "Compatibility of Li7La3Zr2O12 by Solid Electrolyte to All-Solid-State Battery Using Li Metal Anode", Journal of the Electrochemical Society, vol. 157, No. 10, 2010, pp. A1076-A1079.
Maloney et al., "Large Deformation of Chlorotrimethylsilane Treated Silica Aerogels", Journal of Non-Crystalline Solids , vol. 357, Issue 10, May 1, 2011, pp. 2059-2062.
International Search Report and Written Opinion received for PCT Patent Application No. PCT/US2012/046469, mailed on Jan. 31, 2013, 7 pages.
Van Ginneken et al., "Synthesis, Characterisation and Applications of Silica Aerogels", 6th International Symposium on Supercritical Fluids, Versailles, Apr. 2003, 6 pages.
Wolfenstine et al., "Electrical and Mechanical Properties of Hot-Pressed Versus Sintered LiTi2(PO4)3", Solid State Ionics, vol. 180, 2009, pp. 961-967.

* cited by examiner

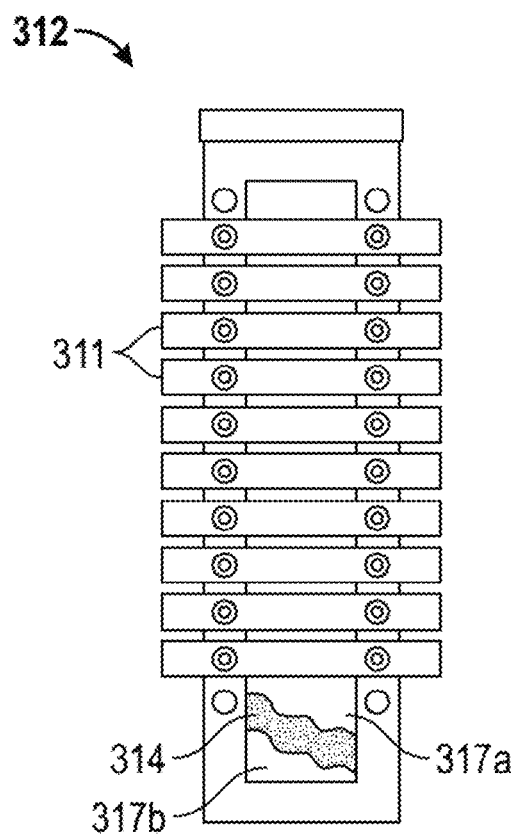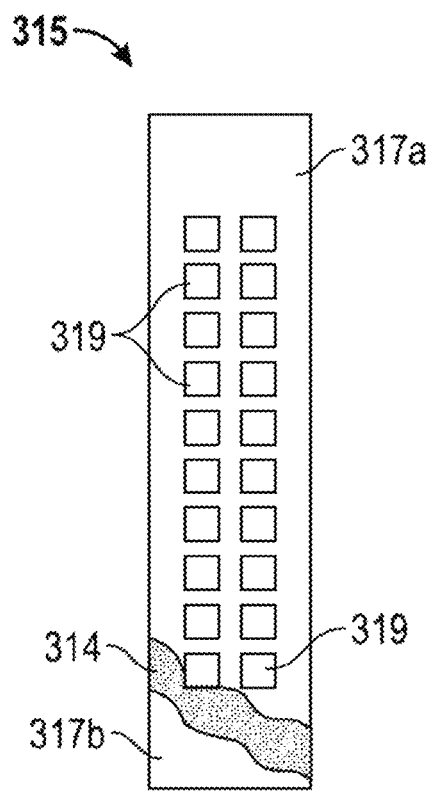
FIG. 3C   FIG. 3D
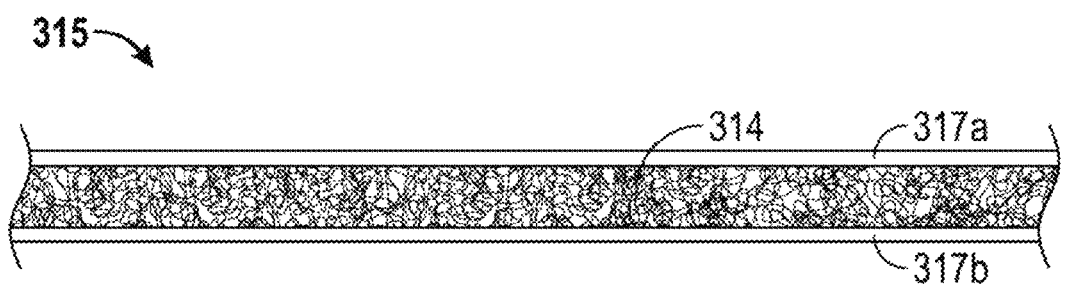
FIG. 3E

Wet gel

1hr 2.5hr 3.25hr

5hr

7hr

24hr

700°C, 1hr, Air

POROUS SOL GELS AND METHODS AND STRUCTURES RELATED THERETO

This application is a U.S. National Stage Filing under 35 U.S.C. 371 from International Application No. PCT/US2012/046469, filed on Jul. 12, 2012 and published in English as WO 2013/009984 on Jun. 13, 2013, which application claims the benefit under 35 U.S.C. 119 (e) of U.S. Provisional Application Ser. No. 61/506,730 filed on Jul. 12, 2011 (hereinafter "'730App"), which applications and publications are hereby incorporated by reference herein in their entireties.

STATEMENT OF GOVERNMENT RIGHTS

This invention was made with government support under Grant No. DGE-0802267awarded by the National Science Foundation. The government has certain rights in this invention.

BACKGROUND

Insulating materials are used as a barrier to maintain a temperature gradient between two spaces. Such materials can be found in the walls, floors and ceilings of buildings, the linings of clothing and in numerous industrial applications, including in thermoelectric applications. Insulating materials have different properties and usages but generally work by preventing heat to be transferred by conduction, convection and/or radiation.

SUMMARY

The various embodiments provide methods of making porous sol gels, including dry porous sol gels such as dried macroporous sol gels and dried hybrid aerogels, as defined herein. The novel porous sol gels include solids which contain a repeating pattern of substantially spherically-shaped solids, such that there is no springback and minimal shrinkage. The dried porous of gels are useful as thermal insulators in a variety of applications.

BRIEF DESCRIPTION OF THE FIGURES

FIG. 3C is a top view of an ambiently dried porous sol gel sandwiched between two mica sheets and contained within the mold of FIGS. 3A and 3B according to an embodiment.

FIG. 3D is a top view of the dried porous sol gel of FIG. 3C after being removed from the mold according to an embodiment.

FIG. 3E is a side view of the dried porous sol gel of FIG. 3D according to an embodiment.

DETAILED DESCRIPTION OF THE EMBODIMENTS

Figure 1A:
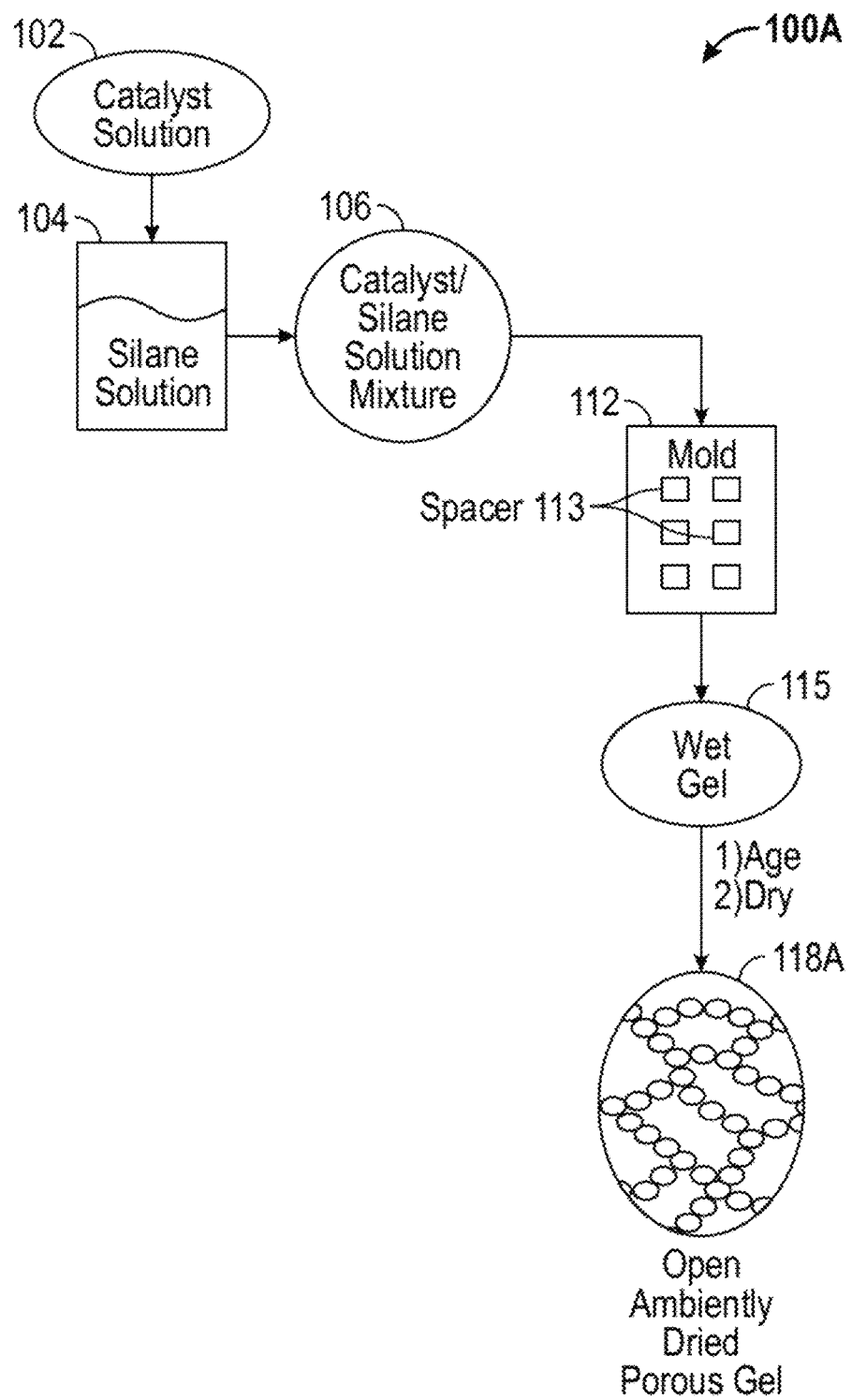
FIG. 1A is a flow diagram showing a method of making open ambiently dried porous sol gels according to various embodiments.

In the following detailed description of embodiments of the invention, embodiments are described in sufficient detail to enable those skilled in the art to practice them, and it is to be understood that other embodiments may be utilized and that chemical, structural and procedural changes may be made without departing from the spirit and scope of the present subject matter. The following detailed description is, therefore, not to be taken in a limiting sense, and the scope of embodiments of the present invention is defined only by the appended claims.

There is a need to develop cost-effective methods for making porous sol gels that can be dried for use as thermal insulators. Attempts to produce aerogels for such purposes, however, have not been successful, as the aerogels are either expensive (e.g., when supercritically dried) or otherwise suffer from shrinkage and/or springback.

The various embodiments described herein provide for methods of making porous sol gels, including non-supercritically dried (e.g., ambiently dried or dried at elevated temperatures and/or elevated or reduced pressures) macroporous or mesoporous sol gels and non-supercritically dried hybrid aerogels, having, the desired properties and/or which can be further processed to have the desired properties, for use in a variety of insulating products as described herein. Various embodiments further provide for dried porous sol gel thermal insulators and structures which include the thermal insulators.

The term "sol gel" as used herein refers to a porous solid network, formed from the solution phase via the hydrolysis and subsequent condensation of appropriate reactants, wherein the pores are filled with solvent. One example of an appropriate reactant is a metal-alkoxide, such as tetraethoxysilane or methyltrimethoxysilane.

The term "hydrolysis" as used herein refers to the chemical conversion of the reactant functional groups to hydroxide groups. One example is the conversion of an alkoxide group $OCH_3$ to a hydroxide group —OH.

The term "condensation reaction" as used herein refers a condensation portion of a solution-based reaction which follows a hydrolysis reaction. During a condensation reaction water is produced as a byproduct of forming metal-oxide-metal bonds.

The term "aerogel" as used herein refers to a microporous or mesoporous sol gel (as this term is understood in the art) which has been dried under conditions adapted to preserve a majority of volume and porosity of a wet gel. When used without qualification, the term "aerogel" can refer to either an open aerogel or a filled aerogel as defined herein.

The term "springback" as used herein refers to reversible dimensional contraction in a sol gel during the wet to dry transition.

The term "ambiently dried porous sol gel" or "ADPSG" as used herein can refer to an ambiently dried macroporous or mesoporous sol gel (ADSG), as well as to an ambiently dried hybrid aerogel (ADHA). When used without qualification, the term "ambiently dried porous sol gel" can refer to either an open or filled ambiently dried porous sol gel.

The term "open ambiently dried porous sol gel" or "Open ADPSG" as used herein refers to an ambiently dried sol gel containing no fillers. Examples include open ambiently dried macroporous or mesoporous gels and open ambiently dried hybrid aerogels.

The term "filled ambiently dried porous sol gel" or "Filled ADPSG" as used herein refers to ambiently dried macroporous or mesoporous sol gels and ambiently dried hybrid aerogels in combination with fillers, such as powders and/or fibers.

The term "hybrid non-supercritically dried aerogel" as used herein refers to an aerogel made from at least two separately cast sol gels, i.e., a first one at least partially inside a second one, and which has been dried under conditions other than super-critical drying conditions. A hybrid non-supercritically dried aerogel includes at least one microporous or mesoporous sol gel and can further include a macroporous gel. Examples of a hybrid non-supercritically dried aerogel include a "hybrid ambiently dried aerogel" and a hybrid freeze-dried aerogel.

The term "ambiently dried hybrid aerogel" or "ADHA" as used herein refers to a hybrid aerogel that has been dried under ambient drying conditions.

The term "freeze-dried hybrid aerogel" as used herein refers to a hybrid aerogel that has been dried under freeze-dried conditions.

The term "open non-supercritically hybrid dried aerogel" as used herein refers to a non-supercritically dried hybrid aerogel containing no fillers.

The term "filled non-critically dried hybrid aerogel" as used herein refers to a non-critically dried hybrid aerogel in combination with fillers, such as powders and/or fibers.

The term "pore" as used herein refers to a depression, slit, or hole of any size or shape in a solid object. A pore can run completely or partially through an object. Pores can also intersect one another.

The term "macroporous" as used herein refers to a material containing pores with a diameter of greater than about 50 nanometers (nm).

The term "microporous" as used herein refers to a material containing pores with a diameter of less than about 2 nm.

The term "mesoporous" as used herein refers to a material containing pores with a diameter between about 2 and about 50 nm.

The term "solvent" or "pore fluid" as used herein refers to a liquid that can dissolve a solid, liquid, or gas.

The term "drying" as used herein refers to removal of a majority of pore liquid (i.e., solvent) from a porous material, such as a sol gel to produce an aerogel or other dried porous sol gel. Trace amounts of the pore liquid may remain in a porous material that has been dried.

The term "ambient" or "ambient conditions" as used herein refers to conditions under which a porous material is dried such that the pore fluid (i.e., solvent) Changes from liquid phase to a gas phase during removal. As such, ambient conditions can include any temperature between the freezing point and boiling point of the pore fluid, in combination with atmospheric or near-atmospheric pressure (e.g., about 0.9 to about 1.1 atm). Ambient conditions include, for example, room temperatures and ambient pressure. As such, ambient conditions include conditions that may be considered substantially natural, without added or reduced heat or pressure.

The term "supercritical drying conditions" as used herein refers to conditions under which a porous material is heated and pressurized up to or beyond a critical point of the pore fluid (i.e., solvent).

The term "freeze-dried" or "freeze-dried conditions" as used herein refers to conditions under Which a porous material is frozen and then evacuated under vacuum to sublimate away the frozen pore fluid (i.e., solvent).

The term "silica" as used herein refers to $SiO_xR_y$, wherein x can range from 1.5 to 2, and y can range from 0 to 1).

The term "silane" as used herein refers to a chemical compound with the formula $SiR_4$, wherein each R is independently selected from any organic radical, including, for example, H, alkyl and/or alkoxy.

The term "insulator" as used herein refers to a material capable of reducing or preventing conduction and/or convection and/or radiation heat transfer.

When used without qualification the term "gel" when used as a noun is understood to refer to a "sol gel." As noted above, the hybrid aerogels as well as the macroporous or mesoporous gels are all considered to be types of "sol gels."

Conventional aerogels have insulating properties. Such aerogels are highly porous silica materials which retain a low thermal conductivity (i.e. less than about 0.1 Wm*K), even at temperatures in excess of about 300° C. Conventional aerogels are produced from a liquid mixture that solidifies at room temperature to form a sol gel, which can allow the aerogel to be cast in place on a structure or preformed using a mold. The sol gels are then supercritically dried to extract (i.e., remove) the solvent from the sol gel.

However, the supercritical drying used to extract the solvent from the sol gel to form the aerogel can be an expensive and energy intensive process. Alternative methods have not proven satisfactory, as conventional non-supercritical drying methods produce aerogels that shrink in volume to a significant degree upon being dried and then expand, a phenomenon known as "springback," which results in an aerogel having a final volume which is larger than the smallest volume obtained by the gel during drying.

Excessive springback (e.g., more than about 20% linear shrinkage, which corresponds with an approximately 49% reduction in volume) can cause a number of problems. For example, excessive springback can cause a gap to form between the gel and the structure (e.g., solid object, encasement, further including any of the structures noted herein such as, but not limited to, heat engines, microelectronics, building, clothing, equipment, pipelines, etc.) in which the aerogel is in contact with. As such, the aerogel is not able to form a proper bond, seal or other connection with the structure, resulting in separation of the aerogel from the structure. Movement of a structure containing a separated aerogel can also cause damage to the structure or otherwise cause the structure to fail. Excessive springback can also cause an aerogel to crack at the interface between the aerogel and the object, a result that is highly undesirable in most applications and particularly with encapsulation of thermoelectrics. Excessive springback can also prevent the ability of an aerogel to be cast around or in a structure altogether.

As noted above, conventional aerogels made under ambient or near ambient conditions are known to shrink significantly upon drying (i.e., about 40% linear shrinkage, which corresponds to an 80% reduction in volume). Shrinkage of an aerogel during drying strains the gel structure which can lead to cracking. As a result, the aerogel can fragment into multiple pieces. A cracked aerogel is also unable to insulate to the same degree as an aerogel which is not cracked. Large amounts of shrinkage can further prevent casting of an aerogel around or in a structure altogether.

In contrast, the various embodiments described herein provide porous sol gels which do not need to be supercritically dried, yet which, upon drying, possess no springback and minimal linear shrinkage (i.e., less than 6%). The lack of springback is due to the morphology of the products described herein, all of which include macropores or mesopores.

Also, in contrast to conventional aerogels, some of which can have a rough, irregular substantially oblong or ellipsoid shape or can otherwise be a type of aggregate that forms an agglomerate, embodiments of the dried porous sol gels described herein have solids which are substantially spherical or "bead-like" in appearance. Specifically, the dried porous sol gels can form a repeating series of solids in a pattern that can be referred to as a "pearl necklace" Which can be oriented in a curved configuration (See, for example FIG. 1A (118A, and FIG. 2, 218). In one embodiment, the solids in the macroporous or mesoporous sol gels have the "pearl necklace" appearance. In one embodiment, the solids in the outer larger macroporous or mesoporous sol gel of a hybrid aerogel can have this appearance.

In one embodiment, the dried porous sol gels are hydrophobic. The dried porous sol gels may also be super-hydrophobic. It is likely that heating of the dried porous sol gels to a temperature in excess of 800° C. however, may cause the dried porous sol gels to lose their hydrophobic nature. However, the dried porous sol gels are also stable at high temperatures (i.e., >300° C.) and can be molded in or around a structure without cracking or separating, while maintaining insulation properties as good as, if not better than, conventional aerogels.

The dried open porous sol gels also remain amorphous up to temperatures of at least 1000° C.

In various embodiments, the dried porous sol gel is a non-supercritically dried porous sol gel, such as a macroporous or mesoporous sol gel or a hybrid aerogel containing two separately cast sol gels. (While certain of the gels described in the '730 App were referred to therein as "aerogels," given the size of the pores, those skilled in the art may instead consider those to be examples of "dried macroporous sol gels").

In one embodiment, the aerogel is a hybrid aerogel containing at least two separately cast gels. In one embodiment, the hybrid aerogel is ambiently dried. Although ambient drying is a cost effective method, other methods of drying would work as well, including, but not limited to freeze-drying, drying under vacuum and/or drying at an elevated temperature and/or at an elevated pressure. As such, and in contrast to conventional methods, supercritical drying of either type of porous sol gel is not necessary, thus providing a highly cost effective manner for producing dried porous sol gels having properties as good as, if not better than, conventional aerogel. Any of the foregoing porous sol gels and dried porous sol gels can also be open or filled as defined herein.

Various embodiments relate to a method of forming a porous sol gel from a sol gel-forming composition. The sol gel-forming composition can include, in one embodiment, a silane having the chemical structure ASi(OX)(OY)(OZ), wherein A, X, Y, and Z are independently selected from $C_{1-5}$ alkyl. The sol gel-forming composition can also include water and a base.

In the embodiment shown in FIG. 1A, a method 100A for producing an open ambiently dried porous sol gel (Open ADPG) 118A is provided. The method comprises mixing a catalyst solution 102 with a silane solution 104 to produce a catalyst/silane solution mixture 106 which can be cast in a mold 112 having spacers 113 and allowed to gel (convert from liquid to solid) to produce a wet gel 115A. The wet gel 115A is then aged (i.e., the reaction is allowed to go to completion) and dried under ambient conditions to produce the Open ADPG 118A with no springback and minimal shrinkage, which is useful as a thermal insulator in a number of applications as described herein. While not wishing to be bound by this theory, it is possible that reduced capillary stresses within the open structure of the ambiently dried porous sol gels described herein allows them to dry ambiently without compression. The ambiently dried porous sol gels can be macroporous and/or mesoporous. Various other drying, conditions can also be used as described herein.

Figure 1B:
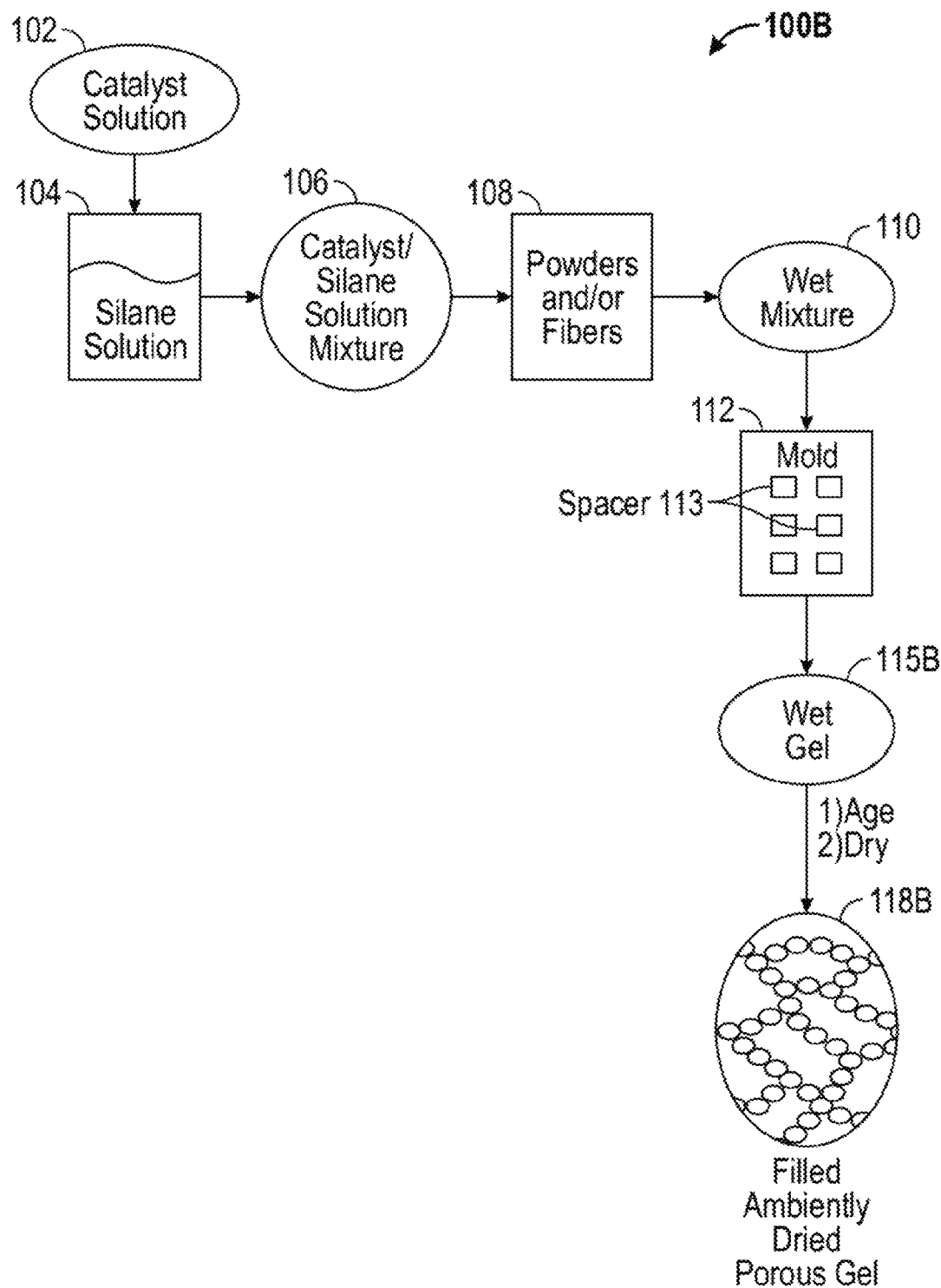
FIG. 1B is a flow diagram showing a method of making filled ambiently dried porous sol gels according to various embodiments.

In the embodiment shown in FIG. 1B, a method 100B for producing a filled ambiently dried porous sol gel (Filled ADPG) 118B is provided. The method begins as in FIG. 1A and comprises mixing a catalyst solution 102 with a silane solution 104 to produce a catalyst/silane solution mixture 106. However, in this embodiment, the catalyst/silane solution mixture 106 is then mixed with powders and/or fibers 108 to produce a wet mixture 110 which is cast in a mold 112. In one embodiment (not shown), the powders and/or fibers 108 are alternatively or additionally added to the mold 112 prior to addition of the catalyst/silane solution mixture 106 to produce the wet mixture 110 within the mold 112. In most embodiments, fibers may be added to the mold 112 directly. In some embodiments, not only has a wet mixture 110 been formed outside the mold 112, but additional fibers are added to the mold 112 as described above. Once cast in the mold 112, the wet mixture 110 is allowed to gel to produce a wet gel 115B. The wet gel 115B is then allowed to age, and in the embodiment shown, is dried under ambient conditions to produce the Filled ADPG 118B with no springback and minimal shrinkage. Filled ADPG is useful as a thermal insulator in a number of applications as described herein. Addition of powders and/or fibers 116 in this manner can improve performance as compared to the Open ADPG 118A of FIG. 1A.

Figure 2:
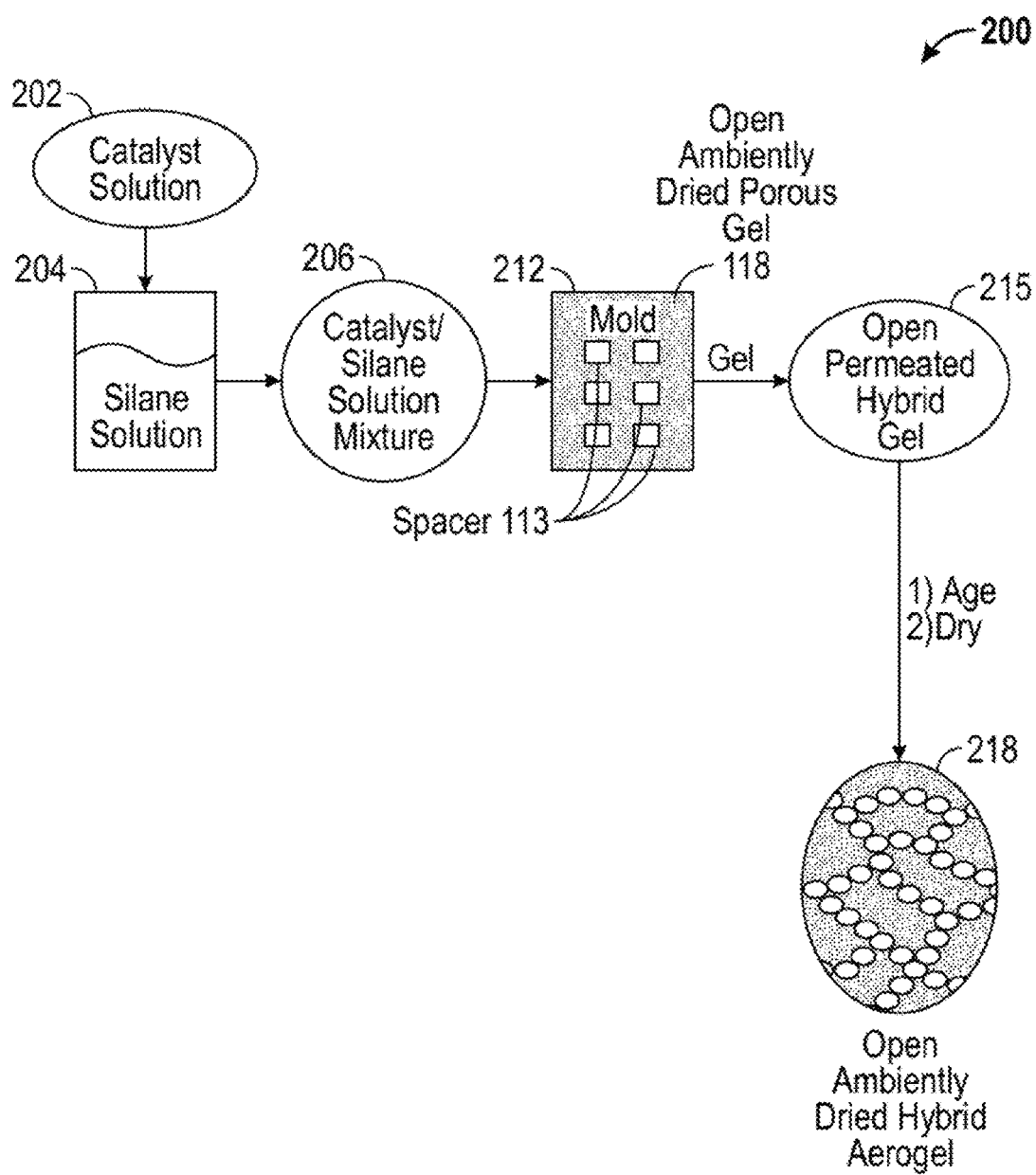
FIG. 2 is a flow diagram showing a method of making open ambiently dried hybrid aerogels according to various embodiments.

In the embodiment shown in FIG. 2, a method 200 for producing an open ambiently dried hybrid aerogel (Open ADHA) containing a combination of at least two separately cast porous sol gels including at least one microporous sol gel is provided. The method provides for sequential formation of at least two gels and comprises mixing a catalyst solution 202 with a silane solution 204 to produce a catalyst/silane solution mixture 206. In the embodiment shown in FIG. 2, the catalyst/silane solution mixture 206 is then mixed with the Open ADHA gel 118A from FIG. 1A and cast in a mold 212, where it gels to produce an open permeated hybrid gel 215. The open permeated hybrid gel 215 is then allowed to age, and is then ambiently dried to produce the Open ADHA 218. In this way, the large pores (e.g., macroporous or mesoporous) of the open ADHA 218 are at least partially filled with at least one microporous and/or mesoporous gel to further limit shrinkage, as compared with the open ambiently dried porous gel 118A. In some embodiments, the open permeated hybrid gel 215 can undergo one or more solvent exchanges and surface modification (e.g., Example 8) to improve surface appearance. In one embodiment, the first porous sol gel (e.g., wet gel 115A in the embodiment shown in FIG. 2) is not dried or is a partially dried wet gel.

The resulting open ADHA 218 comprises two interpenetrating solid oxide networks which are useful as thermal insulators in a number of applications as described herein. Use of at least two porous sol gels in this manner enhances the ability of the aerogel to provide convective heat transport suppression. In one embodiment, more than two solid oxide networks are used. In one embodiment, at least three gels are cast together sequentially. In one embodiment, the open ambiently dried hybrid aerogel 218 comprises a microporous and/or a mesoporous gel cast inside a mesoporous and/or macroporous gel network. In contrast to gel networks Which rely on concurrent gelation of two different compositions to perform a desired function, the hybrid embodiments described herein comprise at least one silica gel cast inside another previously formed silica gel network. As such, and as noted in FIG. 2, the open ADHA 218 is formed from two gels that are formed stepwise, i.e., at different times, rather than at substantially the same time.

As with the embodiment shown in FIG. 1B, powders and/or fibers can also be added during the process of FIG. 2 to form filled ambiently dried hybrid aerogels. In one embodiment (not shown), powders and/or fibers are added prior to the components being placed in the mold 212 and/or at the time the components are placed in the mold 212. Addition of powders and/or fibers in this manner is expected to improve performance of the ambiently dried hybrid aerogel 215 even further.

In any of the above described embodiments, the catalyst solution (102, 202) can be added relatively fast, e.g., faster than dropwise, to the silane solution 104. Surprisingly, addition of the catalyst solution (102,202) quickly results in monolithic porous gels (e.g., 118A) with improved properties (i.e., no springback, less shrinkage, and the like). In one embodiment, the catalyst solution 102, 202) is added to the silane solution (e.g., 104, 204) at a rate of about 0.01% up to about 0.1% up to about 1% up to about 10% to about 100% catalyst solution (102, 202) volume per second, including any range there between, such as about 0.01 to about 50% or about 0.01 to about 20% catalyst solution (102, 202) volume per second. In one embodiment, the catalyst solution (102, 202) is added to the silane solution (104, 204) at a rate of about 1% to about 50% catalyst solution (102, 202) per volume, including any range there between. In one embodiment, the catalyst solution (102, 202) is added at a rate Of at least 0.01% or at least 0.1% or at least 1% or at least 10% or at least 20% or at least 30% or at least 40% up to at least 50% catalyst solution (102, 202) volume per second, including any range there between. In one embodiment, the catalyst solution (102, 202) is added at a rate of between about 5% to about 15% catalyst solution (102, 202) volume per second. In one embodiment, the catalyst solution (102, 202) is added to the silane solution (104, 204) at a rate of about 8% to about 12% catalyst solution (102, 202) volume per second. In one embodiment, the rate is at least 10%, such as at least 9%, at least 8%, at least 7%, at least 6%, at least 5%, at least 4%, at least 3%, at least 2%, or at least 1% or lower, such as at least 0.1% catalyst solution volume per second.

Of note, addition of the catalyst solution (102, 202) to the silane solution (104, 204) quickly is in contrast to conventional thinking for producing dried porous gels from a sol gel, since an increased rate of catalyst addition normally leads to an increased amount of precipitates rather than monoliths. However, in the embodiments described herein, when the catalyst solution is added slowly (i.e., at a rate of less than 0.08 mL/sec, i.e., less than 0.01% catalyst solution volume per second), no monolith forms, resulting in a wet mass of material which dries into powders and "chunks." However, addition of the catalyst solution 102 slowly remains a viable option.

In the various embodiments described above, the wet gel (e.g., FIG. 1A, 115A) and the open permeated hybrid gel 215 can be removed from their respective molds (e.g., 112, 212) prior to drying. This can allow for a more facile removal of the wet gel (e.g., 115A) and open permeated hybrid gel (215) from the mold and can further minimize cracking of the resulting gels. In one embodiment, the porous sol gels dry more quickly when removed while wet or partially wet as more surface area can be exposed to the drying source, e.g., ambient conditions, heated and/or pressurized conditions and/or freeze drying conditions.

The methods described above can further include, in various embodiments, providing a sol gel-forming composition as described herein. In one embodiment, the method includes forming a sol gel from the gel-forming composition and can include drying the gel to produce a dried porous sol gel in conditions other than supercritical drying conditions.

In some embodiments, the dried porous sol gels can be cast in or around a solid object or solid enclosure. In casting a porous sol gel (which can be wet, dried or partially dried), the sol gel-forming composition is added into or around the solid object of solid enclosure and allowed to set. The set sol gel can be allowed to dry, forming the dried porous gel. In other embodiments, the porous sol gel can be cast into a mold, which differs from being cast in or around a solid object or solid enclosure in that the porous sol gel can be removed from the mold prior to, during, or after drying, i.e., when it is a dried porous sol gel. As noted above, the wet gel (e.g., 115A, 115B or the open permeated hybrid gel 215) can be removed from a mold before drying has completed, such as if there is concern that the porous sol gel may become fused, adhered, bonded, or otherwise stuck or attached to the mold, solid object, or encasement when this feature is not desirable or otherwise to speed the drying process.

Chemical bonding can occur between the porous sol gel and the structure to which it is attached as it dries, such as with some oxide surfaces. In some embodiments, such adherence or bonding can be advantageous. For example, in some embodiments, when the catalyst/silane mixture (e.g., 106, 206) is set in or around a solid object or encasement, the mixture can bond (chemically or otherwise), adhere, stick, or otherwise become attached to the structure. In these instances, removing the catalyst/silane mixture (e.g., 106, 206) from the mold (e.g., 112, 212) prior to allowing the mixture to fully dry can minimize the difficulty associated with a dried porous sol gel sticking to the casting environment.

In some embodiments, the method includes adding a silane, a base, and water together in any suitable order, and in any suitable proportions, such that a sol gel-forming composition is formed. Any suitable optional ingredient can be added to the gel-forming composition. The sol gel can be allowed to set or age, and then the set sol gel can be allowed to thy to provide a dried porous gel. The order of addition of the water, base, and silane can be varied, as is suitable. Any suitable mixing technique can be used to combine the various components.

The mixing can take place for any suitable time, and at any suitable temperature, such as at room temperature. The wet mixture (e.g., 110) can be allowed to set for any suitable period. During setting of the wet mixture, the environment around the wet mixture can be kept saturated with particular solvents to prevent the wet mixture from drying prematurely. Preventing the wet mixture from drying prematurely can allow the structure of the wet gel to form more completely, which can help to allow the wet mixture to experience minimal shrinkage during drying and formation of the dried porous sol gel. An open dish of solvent is one example of a method of keeping the environment around the wet mixture saturated with solvent. Other methods of saturating the air around the wet mixture with an organic solvent will be readily known to one of skill in the art and can include enclosing the wet mixture in plastic, such as a plastic bag.

hi some embodiments, the method includes forming a silane solution. Formation of the silane solution can include addition of the silane, such as methyltrimethoxysilane (MTMS), or such as another $C_{1-5}$ alkyltri($C_{1-5}$ alkoxy)silane, to a solvent (e.g. "second solvent"), such as an alcohol (e.g., methanol). In some embodiments, the silane solution can be stirred and/or heated. The method can include formation of a catalyst solution, which, in one embodiment, can include mixing water, solvent (e.g. "second solvent"), and base, such as aqueous ammonium hydroxide. In some embodiments, the catalyst solution can be stirred and/or heated.

The method can include adding one or more fillers, which can include, but are not limited to, one or more powders and/or one or more fibers. The fibers can be sized in any suitable manner, such as by chopping. In one embodiment, the fibers are microscale to macroscale, such as from a few micrometers up to several meters long. In one embodiment, a felt having continuous fibers is used (e.g., silica mat). In some embodiments, the fibers can be placed in the mold or around the solid object or in the encasement and used as a filler to produce filled dried porous gels.

The method can include adding the catalyst mixture to the silane mixture in any suitable manner, with any degree of stirring, and with or without heating or with cooling. The catalyst and silane mixtures can be combined dropwise or quickly, as described herein. In one embodiment, the catalyst and silane mixtures are allowed to fully mix between each addition of the catalyst solution to the silane solution. In one embodiment, the resulting catalyst/silane mixture can be stirred after the addition is completed.

In one embodiment, the resulting catalyst/silane mixture can then be added to the one or more fillers. The resulting wet mixture can then be stirred in any suitable fashion, such that the powders and/or fibers are fully mixed. An example of a suitable stirring method can include, but is not limited to, sonication, or any other suitable stirring method.

In some embodiments, the wet mixture (e.g., 110 in FIG. 1B) or the catalyst/silane solution mixture (e.g., 106, 206 in FIGS. 1A and 2) can then be poured into a mold, or around or into a solid object or encasement. In addition, in some embodiments, sheets of material can be placed around the material that is not covered by the mold. In one embodiment, sheets of mica or other similar material can be placed around the material that is not covered by the mold. In one embodiment, the mixture can be sandwiched by mica sheets during drying (See, for example, FIGS. 3C and 3D). The mica can improve handleability, make the dried porous gel easier to extract from the mold, and can provide an initial solid barrier to block the flow of hot gasses through the drying sol gel. After adding the wet mixture to a mold, or around or into a solid object or encasement, which can optionally contain ingredients such as a filler, solvent, or other optional ingredients, the wet mixture can be stirred for any suitable time and by any suitable means, such as with sonication, although the embodiments are not so limited.

The wet mixture can optionally be covered in any suitable fashion to prevent or reduce premature (trying, such as by trapping solvent vapors the exit the wet mixture to prevent additional solvent vapors from leaving the mixture. Any suitable cover material can be used. In one embodiment, the wet mixture can be covered with mica Sheets. Additional solvent can be used to saturate the air around the mixture to prevent solvent from evaporating from the mixture.

At this point, the wet mixture is allowed to gel, as noted above, to form a wet gel (e.g., 115A, 115B) or a permeated hybrid gel (e.g., 215). The rate of gelation can vary, such as from less than 1 min. to about one day, including any range there between. Longer gelation times can be used, although if shorter time periods produce the desired result, it can save time and expense. In one embodiment, the rate of gelation is no more than 30 min, or no more than 20 ruin, of no more than 15 min, of no more than 10 min, or no more than 8 min, or no more than 6 min. or no more than 4 min., or no more than one min., including any range there between. In one embodiment, gelation time is between about 5 and about 30 min., such as about 10 to 20 min., such as about 14 to 16 min.

The wet sol gel can then set (i.e., age) to allow the condensation reaction to go to completion. In some embodiments, after gelation, while drying is prevented and the gelled mixture sets, hydrolysis of the silane is allowed to proceed in the presence of the water and the base, causing a network to be formed that includes silicon-oxygen bonds. The setting can be allowed to occur for any suitable duration of time. For example, the gelled mixture can be allowed to set for about 1 min, about 5 min, about 10 min, about 15 min, about 20 min, about 30 min, about 40 min, about 50 min, about 1 hour, about 2 hours, about 4 hours, about 8 hours, about 16 hours, about 24 hours, about 48 hours, about 72 hours or higher, such as up to about four to about six days, or about one to three weeks if desired, including any range there between. In most embodiments, it is expected that the mixture ages (the reaction completes) in less than about one day and can be less than about 12 hours, such as no more than about six hours.

After being allowed to set, the set porous sol gel (not shown in figures) can be uncovered and allowed to dry to form the dried porous sol gel as described herein. Drying can occur at ambient temperature and ambient pressure or near-ambient conditions. In one embodiment, the drying can occur in a vacuum environment to facilitate the drying process. In one embodiment, the drying can occur in a, pressurized environment for any suitable reason, for example in environments that must be kept pressurized. In one embodiment, the porous sol gels can be dried, at any temperature between the freezing point and boiling point of the pore fluid. In one embodiment, freeze drying is used. In some embodiments, drying can occur in a slightly heated or in a very heated environment, which in some embodiments can hasten drying. The drying environment can additionally or alternatively be well-ventilated to hasten drying. Additionally, depending on the base and solvents used, for example, a well-ventilated environment can help to reduce exposure to fumes from the drying sol gel. Although one could supercritically dry the various porous sol gels described herein, that would only add to the cost and complexity of the process.

In some embodiments, before the set sol gel is fully dried it can be placed in, immersed in, or subjected to a solvent bath. In some examples, any method of contacting the drying sol gel and the solvent bath liquid can be used. In one example, the solvent bath is an ethanol bath. In some examples, the bath can help to wash materials out of the sol gel, including out of pores of the gel, such as unreacted liquids or other liquids, and such as soluble solids or suspended solids. The material washed out of the sol gel can include, but is not limited to, methanol, ammonia, water, or residual silane such as methyltrimethoxysilane (MTMS). The solvent can be any suitable solvent, such as an aqueous liquid, or an organic liquid such as any organic solvent given herein. In other embodiments, no washing or bath step occurs, and the drying gel is allowed to dry with natent liquid in the pores.

One of skill in the art will readily recognize that in certain embodiments, variations of this method can be performed without departing from the method described. For example, a variety of containers can be used for the mixing of ingredients, a variety of formulations are encompassed as acceptable compositions as described herein, a variety of mixing and heating or cooling conditions can be used during any of the stages of the method, a variety of molds, solid objects and encasements can be used including various shapes and sizes, and a variety of ventilation conditions can be employed.

Figure 3A:
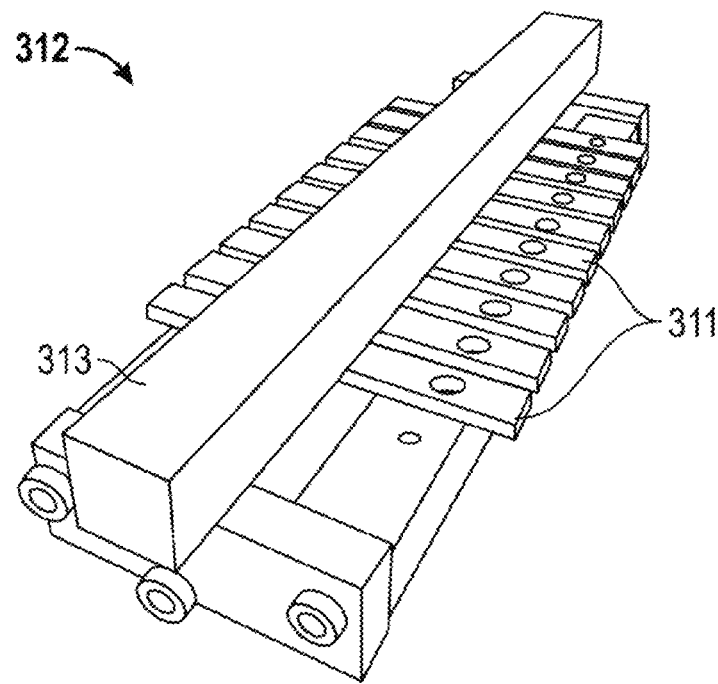
FIG. 3A is a perspective top view of a mold useful herein according to an embodiment.
Figure 3B:
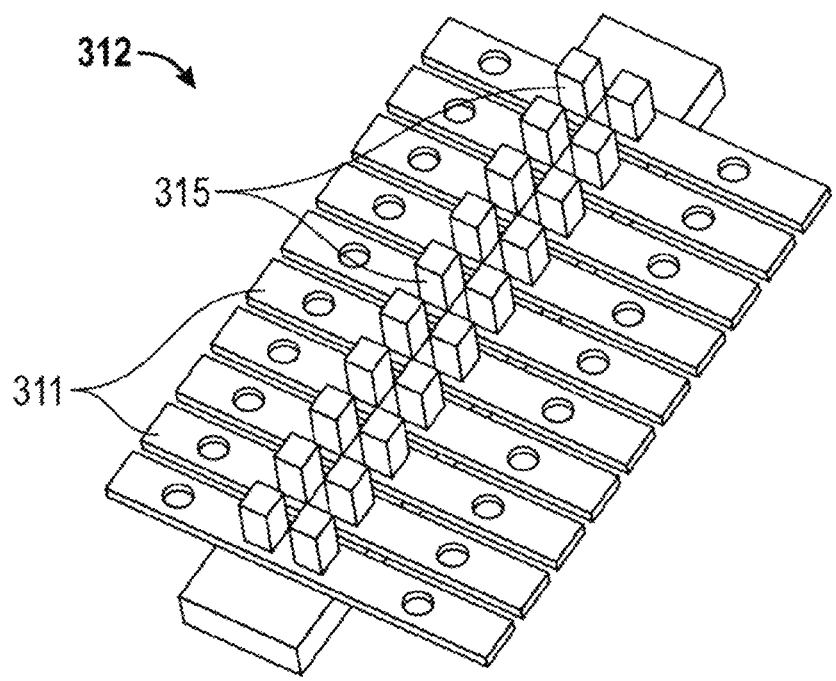
FIG. 3B is a perspective bottom view of the mold of FIG. 3A according to an embodiment.

In one embodiment, the molds (112, 212) can be of any desired shape and size. FIG. 3A illustrates a perspective top view of a mold 312 containing post supports 311 and a mold container 325 which may be useful herein. As such, FIG. 3A can be considered the "negative mold" prior to casting. The bottom perspective view shown in FIG. 3B reveals the rigid posts or thermoelectric leg inserts 320 supported by the post supports 311 and contained within the mold container 325. The thermoelectric leg inserts 320 are useful to create an opening (i.e., spacer) of a desired size into a sol gel which is poured into the mold 312. The thermoelectric leg inserts 320 can be any suitable size and shape, such as on the order of millimeters or centimeters or larger or smaller.

A wet mixture (e.g., FIG. 1B, 110) can be added to the mold 312 and allowed to gel, age and, optionally, also dry in the mold 312. In one embodiment, outer sheets, such as a lower mica sheet 317A, can be added to the mold 312 prior to addition of the wet mixture (e.g., 110), with an upper mica sheet 317B added after the wet mixture (e.g., 110) has been cast. Such outer layers can serve to provide an initial solid barrier to block the flow of hot gasses through the drying porous gel, i.e., block gas convection.

FIG. 3C is a top view of the mold 312 with some of the post supports 311 removed and further containing a dried porous gel 318, which is sandwiched in between the upper and lower mica sheets, 317A and 317B, respectively, which can also provide enhanced durability to the dried porous gel 318. As noted above, such outer layers can also improve handleability, such as allowing for easy extractability of the dried porous gel 318 from the mold 312.

FIG. 3D is a top view of a layered dried porous gel 330, which comprises the dried porous gel 318 sandwiched between the upper and lower mica sheets, 317A and 317B, respectively, now containing spacers 313 where the thermoelectric leg inserts 320 were, with FIG. 3E providing a side view of the layered dried porous gel 330.

Embodiments of any of the aforementioned dried porous sol gels can have low shrinkage as compared to conventional aerogels. The filled dried porous gels can exhibit even lower shrinkage, as a result of the presence of fillers, e.g., one or more powders and/or one or more fibers. The dried hybrid aerogels also exhibit lower shrinkage. Expressed in terms of linear dimensions, the shrinkage of some embodiments, in comparing a linear dimension of the first volume to the corresponding linear dimension of the second volume, can be no more than 7.2% linear shrinkage. In one embodiment, the linear shrinkage is between about substantially zero or higher, up to about 7.2%, such as about 0.01% up to about 7.2%, including any range there between. In one embodiment, the linear shrinkage is between about 0.10% and about 5.0%, such as from about 1% to about 3%, including any range there between. Estimating the volume as a cube, where "X" represents the percent shrinkage of each linear dimension as compared to the corresponding linear dimension of the first volume, the percent shrinkage can be expressed as $(1-(1 X)^3)*100$. For example, the linear shrinkage of the cube for a volume Shrinkage is 20% is determined as follows: $(1-(1-X)^3)*100=20\%$ for X. In this case, X=7.2%. That is, a 7.2% linear shrinkage results in an approximately 20% volume shrinkage, assuming a cube and isotropic shrinkage.

For example, expressed in terms of volume, estimating the volume as a cube, the shrinkage of some embodiments, in comparing the first volume to the second volume, can be no more than 20%. In one embodiment, the volume shrinkage is between about substantially zero or higher, up to about 20%, including any range there between. In one embodiment, the volumetric shrinkage is between about 0.1% and about 15%, such as from about 1% to about 10%, such as from about 1% to about 5%, including such any range there between. A cube is simply used here as one example, and it is to be understood that the first and second volume of the various embodiments can be any shape, which is not limited to a cube. It is to be understood that differences specified herein with regard to linear dimensions of volumes or with regard to differences between volumes can apply to a volume with any shape. Similar calculations can be performed to estimate the volume shrinkage of any shape, wherein any number of linear dimensions of the shape can undergo shrinkage to result in an overall volume shrinkage. In some embodiments, the shrinkage can be very low e.g. less than 5% linear or by volume down to 0% linear or by volume, including any range there between.

Embodiments of the dried porous sol gel can have special properties that allow it to form with minimal shrinkage. For example, the dried porous gel can have an open silica-derived or silane-derived structure, which can reduce capillary stresses during drying. The dried porous gel can have a bimodal of multimodal silica-derived or silane-derived structure, e.g. two or more different average particle sizes, wherein the larger particles can reinforce the structure against capillary forces, and wherein the smaller particles can block gas convection. In another example, the fiber reinforcement can give the dried porous sol gel a "structure" that resists shrinkage. In some examples, the combination of fiber reinforcement with other optional ingredients such as an opacifier or other powder, can give the dried porous gel a structure that resists shrinkage. In some examples, the hydrophobic surface of the dried porous sol gel (at least partially due to the alkyl and alkoxy groups of the silane used in the gel-forming composition) can reduce surface tension of the dried porous sol gel, which can reduce surface tension of the dried porous sol gel during drying. Reduction of surface tension can reduce forces that occur in the dried porous sol gel dining drying. In one embodiment, powder opacifiers can reinforce or modify the structure of the dried porous gel to cause it to be stronger.

The sol gel can be formed from a sol gel-forming composition. The sol gel-forming composition can include a silane, base and water. The method can include forming, aging and drying the gel to provide a dried porous gel. The silane undergoes hydrolysis in the presence of water and base to create a network including silicon-oxygen bonds. In one embodiment, the silane has the chemical structure ASi(OX)(OY)(OZ), wherein A, X, Y, and Z are independently selected from $C_{1-5}$ alkyl. Differently expressed, the silane is a $C_{1-5}$ alkyltri($C_{1-5}$ alkyl)silane. Examples of $C_{1-5}$ alkyl groups include, but are not limited to, linear or branched alkyl groups, including methyl, ethyl, n-propyl, isopropyl, n-butyl, i-butyl, t-butyl, pentyl including n-, i-, t-pentyl, and the like. In some examples, the silane can be methyltrimethoxysilane.

The wt % provided in the following paragraphs refers to the percent by weight based on the total weight of the gel-forming composition.

For example, the silane can be present in amounts from about 1 wt % to about 99 wt %, about 5 wt % to about 90 wt %, or about 10 wt % to about $0 wt % of the uncured composition, including any range there between. In some embodiments, the silane can be present in from about 5 wt % to about 70 wt %, about 15 wt % to about 40 wt, or about 27 wt % to about 29 wt %, of the uncured composition, including any range there between. In some embodiments, the silane can be present in from about 5 wt % to about 80 wt %, about 25 wt % to about 50 wt %, or about 37 wt % to about 39 wt % of the uncured composition including any range there between.

Various embodiments of the gel-forming composition can include water. The resulting dried porous sol gel can also include residual water. The water in the gel-forming composition allows hydrolysis of the silane, forming a network including silicon-oxygen bonds.

The water can be present in from about 0 wt % to about 90 wt %, about 0 wt % to about 75 wt %, or about 0 wt % to about 50 wt of the uncured composition including any range there between. In some embodiments, the water can be present in from about 2.5 wt % to about 60 wt %, about 5 wt % to about 30 wt %, or about 13 wt % to about 15 wt % of the uncured composition, including any range there between. In some embodiments, the water can be present in from about 5 wt % to about 80 wt %, about 10 wt % to about 40 wt %, or about 18 wt % to about 20 wt % of the uncured composition, including any range there between.

Various embodiments of the gel-forming composition can include a base. The base can be any suitable base. The base can drive a condensation reaction between the silane and the water. For example, the base can include, but is not limited to, ammonium hydroxide, sodium hydroxide, potassium hydroxide, sodium carbonate, sodium bicarbonate, potassium carbonate, potassium bicarbonate or combinations thereof. In some embodiments, the base can be an aqueous solution of base. In one embodiment, the base is ammonium hydroxide. In one embodiment, the base is an aqueous solution of ammonium hydroxide (e.g. ammonia in water).

The base can be present in from about 0 wt % to about 60 wt %, about 0 wt % to about 30 wt %, or about 0 wt % to about 15 wt % of the uncured composition, including any range there between. In some embodiments, the base can be present in from about 1 wt % to about 25 wt %, about 2 wt % to about 12 wt %, or about 4 wt % to about 6 wt % of the uncured composition, including any range there between. In some embodiments, the base can be present in from about 1 wt % to about 40 wt %, about 3 wt % to about 20 wt %, or about 6 wt % to about 8 wt % of the uncured composition, including any range there between.

Various embodiments of the gel-forming composition can include one or more types of fillers, including, but not limited to, one or more powders (nanoscale to macroscale or granular in size) and/or one or more types and sizes of fibers, such as a fiber reinforcement. In one embodiment, a fiber reinforcement helps to reinforce the dried porous sol gel structure, and in some embodiments can help to cause beneficial minimal shrinkage and minimal springback, e.g. the fibers can help the mechanical properties of the dried porous sol gel. In some embodiments, the fibers are used as-is in the gel-forming composition. In other embodiments, the fibers are chopped, cut, or otherwise divided as compared to their original form. In one embodiment, the fibers are received as a continuous fiber or felt which can be heated to remove any organic hinder present.

In one embodiment, the fiber reinforcement can be quartz fiber or silica fiber. In one embodiment, the fiber reinforcement can be zirconia fiber, carbon fiber, carbon nanotubes, alumina fiber, cellulosic fiber, nickel fiber, copper fiber, glass fiber steel fiber, aluminum fiber, titanium fiber, platinum fiber and/or any other suitable metallic, inorganic or organic fibers.

The wt % provided in the following paragraphs refers to the percent by weight based on the total weight of the gel-forming composition.

For example, the reinforcing fiber can be present in from about 0 wt % to about 95 wt %, about 0 wt % to about 80 wt %, or about 0 wt % to about 70 wt % of the uncured composition, including any range there between. In some embodiments, the reinforcing fiber can be present in from about 2 wt % to about 40 wt %, about 4 wt % to about 20 wt %, or about 8 wt % to about 10 wt % of the uncured composition, including any range there between. In some embodiments, the reinforcing fiber can be present in from about 0 wt % to about 20 wt %, about 0 wt % to about 10 wt %, or about 0 wt % to about 5 wt % of the uncured composition, including any range there between.

Various embodiments of the gel-forming composition and the resulting dried porous sol gel can additionally or alternatively include powders. The powders can be inert, or can fulfill various roles during, formation of the gel, including for example, aiding in suspension of titania powder or any other ingredient.

In one embodiment, the powder can include, but is not limited to, silica, clay, talc, carbon black, graphite, activated carbon, titanium oxides, including titanium dioxide, mica, calcium carbonate, calcium sulfate, barium carbonate, magnesium carbonate, magnesium sulfate, barium sulfite, oxysulfate tin oxide, aluminum oxides, alumina, zirconium oxides, kaolin, silicon carbide, and metal powder. Examples include various forms of silica, including silicates and metallosilicates including quartz, fumed colloidal silica, precipitated silica, and any combination thereof.

The powder can be present in from about 0 wt % to about 95 wt %, about 0 wt % to about 80 wt %, or about 0 wt % to about 40 wt % of the uncured composition, including any range there between. In some embodiments, the powder can be present in from about 2 wt % to about 40 wt %, about 4 wt % to about 20 wt %, or about 8 wt % to about 10 wt % of the uncured composition, including any range there between. In some embodiments, the powder can be present in from about 0 wt % to about 20 wt %, about 0 wt % to about 10 wt %, or about 0 wt % to about 5 wt % of the uncured composition, including any range there between.

In one embodiment, the powder is an opacifer. The opacifier is any ingredient that increases the resulting opaqueness of the dried porous sol gel and/or scatters radiation to improve thermal performance of the dried porous sol gel. In one embodiment, the opacifier is an opacifying powder.

The opacifier can include, for example, titania ($TiO_2$), tin dioxide ($SnO_2$), lamp black, carbon black, nigrosin, prussion blue, methylene blue, metallic powder (gold, silver, and the like), alumina, graphite, graphene, graphene oxide, carbon nanotubes and the like.

In one embodiment, the opacifier is titania powder having any suitable particle size, such as between about 1 and about 2 μm. In one embodiment, the opacifier is Alfa Aesar titania, #43047.

The opacifier can be present in from about 0 wt % to about 95 wt %, about 0 wt % to about 80 wt %, or about 0 wt % to about 40 wt % of the uncured composition, including any range there between. In some embodiments, the opacifier can be present in from about 2 wt % to about 40 wt %, about 4 wt % to about 20 wt %, or about 8 wt % to about 10 wt % of the uncured composition, including any range there between. In some embodiments, the opacifier can be present in from about 0 wt % to about 20 wt %, about 0 wt % to about 10 wt %, or about 0 wt % to about 5 wt % of the uncured composition, including any range there between. The wt % provided in this paragraph also refers to the percent by weight based on the total weight of the gel-forming composition.

Various embodiments of the gel-forming composition can include a second solvent (with the "first solvent" being an alcohol (e.g., methanol), water and/or a non-polar solvent). Residual traces of the second solvent can also be present in the resulting dried porous sol gel. (Herein, the second solvent is referred to as the "second" solvent to avoid confusion with the water present in the gel-forming composition). In some embodiments, the second solvent can be water. In some examples, the second solvent can be an organic solvent, such as ethers like diethyl ether, halogenated solvents like chloroform or methlyene chloride, alcohols like methanol, ethanol, normal- or iso-propanol, and the like. The second solvent can be selected to have a boiling point that allows facile drying of the gel; thus solvents with boiling points of 30-50° C. or less can allow relatively fast drying, whereas solvents with higher boiling points can produce gels that take longer to dry and form the dried porous sol gel. In some embodiments, the second solvent can be selected to be a water miscible solvent, such as methanol or ethanol or other alkanol. Nonlimiting examples of solvents are silicones, organic compounds, water, alcohols, ionic liquids, and supercritical fluids.

The second solvent can be present in from about 0 wt % to about 99 wt %, about 0 wt % to about 85 wt %, or about 0 wt % to about 70 wt % of the uncured composition, including any range there between. In some embodiments, the second solvent can be present in from about 5 wt % to about 70 wt %, about 20 wt % to about 50 wt %, or about 36 wt % to about 38 wt % of the uncured composition, including any range there between. In some embodiments, the second solvent can be present in from about 5 wt % to about 50 wt %, about 15 wt % to about 30 wt %, or about 26 wt % to about 28 wt % of the uncured composition, including any range there between. The wt % provided in this paragraph also refers to the percent by weight based on the total weight of the gel-forming composition.

Various embodiments of the gel-forming composition can include other optional ingredients, some of which may be considered as fillers. Such optional additional components include, but are not limited to, surfactants, emulsifier, dispersants, polymeric stabilizers, crosslinking agents, combinations of polymers, crosslinking agents, and catalysts useful for providing a secondary polymerization or crosslinking of the particles, rheology modifiers such as thickeners, density modifiers, aziridine stabilizers, cure modifiers such as hydroquinone and hindered amines, free radical initiators such as organic peroxides and ozonides, polymers, diluents, acid acceptors, antioxidants, heat stabilizers, flame retardants, scavenging agents, silylating agents, foam stabilizers, additional solvents, diluents, plasticizers, conductive additives, inorganic particles, pigments, dyes, dessicants, and combinations thereof.

Thickening agents can optionally be used to provide a convenient viscosity. For example, viscosities within the range of 500 to 25,000 mm$^2$/s at about 25° C. or more, including any range there between, or otherwise in the range of 3,000 to 7,000 mm$^2$/s at 25° C., including any range there between, can be suitable. Suitable thickening agents are exemplified by sodium alginate; Mil arabic; polyoxyethylene; guar gum; hydroxypropyl guar gum; ethoxylated alcohols, such as laureth-4 or polyethylene glycol 400; cellulose derivatives exemplified by methylcellulose, carboxymethylcellulose, methylhydroxypropylcellulose, hydroxypropylcellulose, polypropylhydroxyethylcellulose; starch and starch derivatives exemplified by hydroxyethylamylose and starch amylose; locust bean gum; electrolytes exemplified by sodium chloride and ammonium chloride; saccharides such as fructose and glucose; and derivatives of saccharides such as PEG-120, methyl glucose diolate; or mixtures of two or more of these. Alternatively the thickening agent can be selected from cellulose derivatives, saccharide derivatives, and electrolytes, or from a combination of two or more of the above thickening agents exemplified by a combination of a cellulose derivative and any electrolyte, and a starch derivative and any electrolyte. The thickening, agent can be present in an amount from about 0.05 to 10 wt %; alternatively from about 0.05 to 5 wt %, based on the total weight of the composition. Thickeners based on acrylate derivatives, such as polyacrylate crosspolymer. Acrylates/C1030 Alkyl Acrylate crosspolymer, polyacrylamide derivatives, or sodium polyacrylate can be added. The thickening agent can be filmed silica.

Stabilizing agents can optionally be used. Stabilizing agents can include one or more electrolytes, polyols, alcohols such as ethyl alcohol, and hydrocolloids. Typical electrolytes are alkali metal salts and alkaline earth salts, especially the chloride, borate, citrate, and sulfate salts of sodium, potassium, calcium and magnesium, as well as aluminum chlorohydrate, and polyelectrolytes, especially hyaluronic acid and sodium hyaluronate. When the stabilizing agent is, or includes, an electrolyte, it can amount to, for example, about 0.1 to about 5 wt % and, alternatively, about 0.5 to about 3 wt % of the total composition, including any range there between. The hydrocolloids can include gums, such as xanthan gum or Veegum® and thickening agents, such as carboxymethyl cellulose. Polyols, such as glycerine, glycols, and sorbitols can also be used. Alternative polyols can be glycerine, propylene glycol, sorbitol, and butylene glycol. If a large amount of a polyol is used, the electrolyte can optionally be omitted. However, a combination of an electrolyte, a polyol and a hydrocolloid can be used, for example, with a combination of magnesium sulfate, butylene glycol and xanthan gum.

Waxes or wax-like materials can be optional components, wherein such components generally have a melting point range of about 35 to about 20° C. at atmospheric pressure, including any range there between. Waxes in this category include, but are not limited to, synthetic wax, ceresin, paraffin, ozokerite, beeswax, carnauba, microcrystalline wax, lanolin, lanolin derivatives, candelilla, cocoa butter, shellac wax, spermaceti, bran wax, capok wax, sugar cane wax, montan wax, whale wax, bayberry wax, soy waxes, or mixtures thereof. Examples of waxes capable of being used as non-silicone fatty substances can include, but are not limited to, animal waxes, such as beeswax; vegetable waxes, such as carnauba, candelilla wax, mineral waxes, for example paraffin or lignite wax or microcrystalline waxes or ozokerites; synthetic waxes, including polyethylene waxes, and waxes obtained by the Fischer-Tropsch synthesis. Examples of silicone waxes can include, but are not limited to, polymethylsiloxane alkyls, alkoxys and/or esters.

Optional components can also include, but are not limited to, silicones, organofunctional siloxanes, alkylmethylsiloxanes, siloxane resins and silicone gums. Alkylmethylsiloxanes useful for compositions of the present invention can have a formula such as: $Me_3SiO[Me_2SiO]_y[MeRSiO]_z SiMe_3$, in which R is a hydrocarbon group containing 6-30 carbon atoms, Me represents methyl, and the degree of polymerization (DP), e.g., the sum of y and z is 3-50. Both the volatile and liquid, species of alkylmethysiloxanes can be used in the composition. Phenyl functional siloxanes can also be added.

Silicone gums can also be optional components. Polydiorganosiloxane gums are known in the art and are available commercially. These gums include generally insoluble polydiorganosiloxanes having a viscosity in excess of 1,000,000 centistoke ($mm^2s$) at about 25° C., including any range there between, or otherwise, greater than 5,000,000 centistoke ($mm^2/s$) at about 25° C., including any range there between. These silicone gums are typically sold as compositions already dispersed in a suitable solvent to facilitate their handling. Ultra-high viscosity silicones (those typically having a kinematic viscosity from about 5 million centistoke ($mm^2/s$) at about 25° C. to about 20 million centistoke ($mm^2/s$) at 25° C. can also be included as optional components, including any range there between. In some embodiments, compositions of this type can be in the form of suspensions.

Silicone resins can be optional components. Such resins are generally highly crosslinked polymeric siloxanes. Crosslinking can be obtained by incorporating trifunctional and/or tetrafunctional silanes with the monofunctional silane and/or difunctional silane monomers used during manufacture. The degree of crosslinking required to obtain a suitable silicone resin will vary according to the specifics of the slime monomer units incorporated during manufacture of the silicone resin. In general, any silicone having a sufficient level of trifunctional and tetrafunctional siloxane monomer units, and hence possessing sufficient levels of crosslinking to dry down to a rigid or a hard film can be considered to be suitable for use as the silicone resin. Commercially available silicone resins suitable for use are generally supplied in an unhardened form in low viscosity volatile or nonvolatile silicone fluids, and can be incorporated into compositions of the present invention in their non-hardened forms rather than as hardened resinous structures. Silicone carbinol fluids can be optional components, and can be commonly described as substituted hydrocarbyl functional siloxane fluids or resins.

Water soluble or water dispersible silicone polyether compositions can be optional components. Examples include, but are not limited to, polyalkylene oxide silicone copolymers, silicone poly(oxyalkylene) copolymers, silicone glycol copolymers, or silicone surfactants. These compositions can be linear rake or graft type materials, ABA or ABn type where the B is the siloxane polymer block, and the A is the poly(oxyalkylene) group. The poly(oxyalkylene) group can include polyethylene oxide, polypropylene oxide, or mixed polyethylene oxide/polypropylene oxide groups. Other oxides, such as butylene oxide or phenylene oxide, can be included.

In some examples, the gel-forming composition can be used neat, or in oil/water, organic solvent/water, water/oil, water/organic solvent, and non-aqueous oil/oil, oil/organic solvent, and organic solvent/oil emulsions or multiple phase emulsions using silicone emulsifiers. Typically the water-in-silicone emulsifier in such formulation is non-ionic and is selected from polyoxyalkylene-substituted silicones (rake or ABn type), silicone alkanolamides, silicone esters and silicone glycosides.

When the composition that forms the gel is an oil-in-water emulsion, it can include common ingredients generally used for preparing emulsions including, but not limited to, non-ionic surfactants well known in the art to prepare oil/water emulsions. Examples of non-ionic surfactants can include, but are not limited to, polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, and polyoxyalkylene glycol modified polysiloxane surfactants.

The composition that forms the gel can be under the form of aerosols in combination with propellant gases, that include, but are not limited to, carbon dioxide, nitrogen, nitrous oxide, volatile hydrocarbons such as butane, isobutane, or propane and chlorinated or fluorinated hydrocarbons such as dichlorodifluoromethane and dichlorotetrafluoroethane or dimethylether.

Embodiments will be further described by reference to the following examples, which are offered to further illustrate the various embodiments. It should be understood, however, that many variations and modifications may be made while remaining within the scope of the embodiments described.

EXAMPLE 1

Filled Ambiently Dried Non-Microporous Sol Gel ("Filled ADSG")

A silane solution (e.g., FIG. 1A, 104) was prepared in a vial by mixing 1.95 mL of methanol (methyl alcohol, anhydrous 3041-10 from Macron Chemicals) and 3.93 mL of methyltrimethoxysilane (MTMS, Sigma Aldrich #246174). In another vial, a catalyst solution (e.g., FIG. 1A, 102) was prepared by mixing methanol (1.95 mL), water (1.56 mL), and aqueous ammonium hydroxide (0.608 mL, 30% by volume). Each vial was allowed to stir for about 10 minutes. To a third vial was added titania powder (1 g, $TiO_2$, 1-2 µm, Alfa Aesar #43047), filmed silica (0.2 g, 80-100 $m^2$/g, Alfa Aesar #42737), silica powder (0.8 g, 1-2 µm, Alfa Aesar #13024), and quartz fiber reinforcement (about 50 g, chopped fibers, Saint-Gobain) which together comprised the "forming powders/fibers" (e.g., FIG. 1B, 108).

The catalyst solution (e.g., 102) was added dropwise to the silane solution (e.g. 104) with stirring. There was a visible shimmering or cloudy region that formed between the two solutions. Each drop was fully incorporated (e.g. the solution was clear and homogenous) before the next drop was added. The approximate drop rate was one drop per second or 0.08 mL/sec. When all the catalyst solution (e.g., 102) had been added, the precursor solution (e.g., catalyst/silane solution mixture. FIG. 1B, 106) was stirred for 10-30 seconds. The precursor solution (e.g., 106) was poured into the third vial containing the forming powders/fibers (e.g., 108). Using a probe-tip sonicator, the components were sonicated for about 30 seconds, dispersing the powders/particles (e.g., 108) to form a milky white appearing wet mixture (e.g., FIG. 1B, 110). The wet mixture (e.g., 110) was poured into a mold (e.g., FIG. 1B, 112 and FIGS. 3A-3E) and covered to prevent drying. The wet mixture (e.g., 110) was allowed to set in the mold (e.g., 112) for 15 minutes, until a wet gel (e.g., FIG. 1B, 115B) was formed. The wet gel (e.g., 115B) was allowed to age for between about 24 hours and 72 hours. Care was taken to prevent the wet gel (e.g., 115B) from drying out by placing in a sealed container, which included both plastic bags and containers. In some testing, the aged wet sol gel was dried in the mold under ambient conditions (1 atm air at ~25° C.) initially for about one day to produce a dried porous sol gel (e.g., FIG. 1B, 118B). In other testing, the samples were removed from the mold prior to drying. It was determined that removing the samples from the mold prior to drying allowed for a more facile removal of the sample from the mold and minimized cracking of the samples.

EXAMPLE 2

Filled Ambiently Dried Non-Microporous Sol Gel ("Filled ADSG")

Filled Ambiently Dried Non-Microporous Sol Gel ("Filled ADSG") was made according to the method described in Example 1, except that the third vial contained titania powder (TiO2, anatase, 99.9%, 32 nm APS Powder from Alfa Aesar #39953) only.

Figure 20:
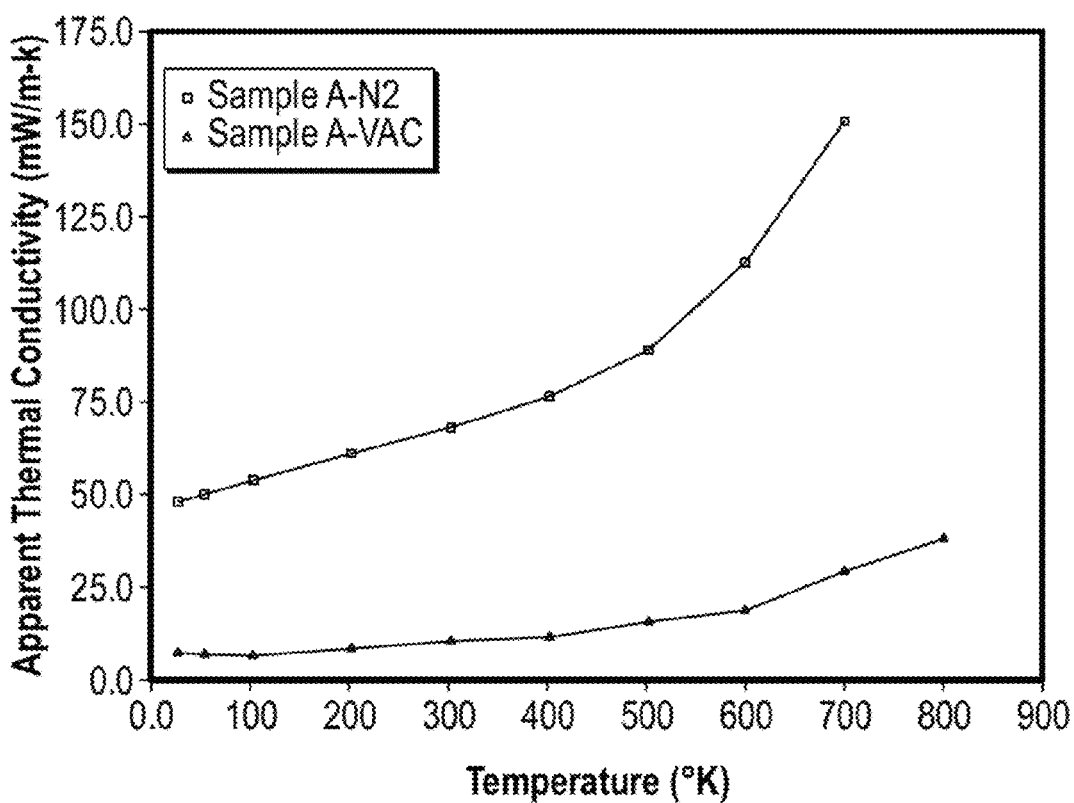
FIG. 20 is a graph showing thermal conductivity of filled ambiently dried porous sol gels in vacuum and in nitrogen atmosphere according to various embodiments.

The thermal diffusivity, specific heat, and bulk densities were measured and used to calculate the apparent thermal conductivity. The apparent thermal conductivity is plotted in FIG. 20.

The sample labeled with -N2 was measured in a Nitrogen environment. The sample was measured through 700° C. After collecting the 700° C. point, the instrument furnace had a problem and was cooled. After inspecting the sample, it was noticed that the sample had changed to a slight darker gray color.

The second sample, labeled -VAC, was the sample measured in a vacuum. This sample was measured through 800° C. The sample upon cooling was significantly darker than the sample measured in air.

These results are assumed to be typical for a filled ADSG. The thermal conductivity of the filled ADSG is comparable to supercritically dried aerogel in vacuum.

The results obtained were based on the material thickness measured. A change in thickness can change the thermal diffusivity results. This is more pronounced when the material is measured in a gas environment due to gas heat transfer mechanism along with the resistance of the material measured. Changing gas composition or gas pressure will also change the thermal conductivity of this material.

EXAMPLE 3

Open Ambiently Dried Non-Microporous Sol Gel ("Open ADSG")

Open Ambiently Dried Non-Microporous Sol Gel ("Open ADSG") was made according to the method described in Example 1, but with no "third vial" of powders and/or fillers. Thus, no fillers were used.

Figure 4A:
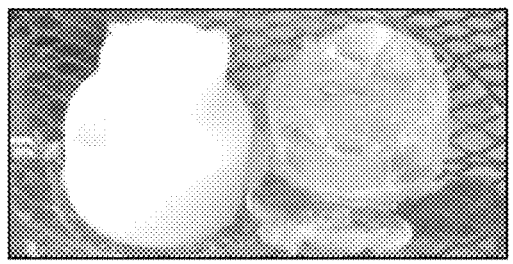
FIGS. 4A-4H are time lapse images of open porous sol gels and conventional aerogels being ambiently dried side-by-side according to an embodiment.
Figure 4B:
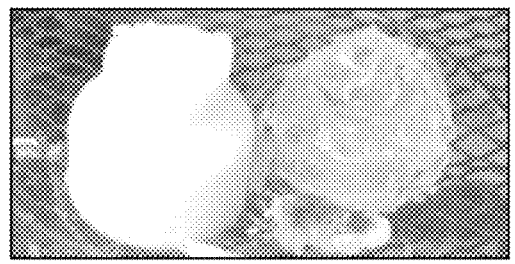
Figure 4C:
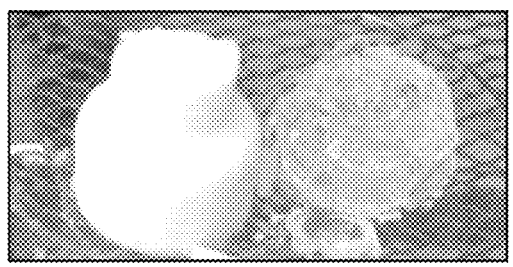
Figure 4D:
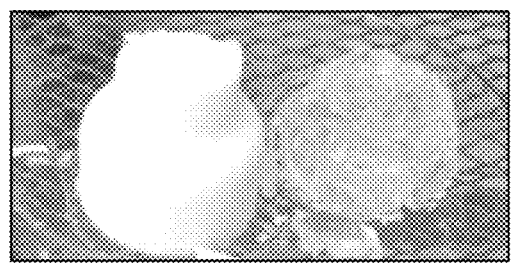
Figure 4E:
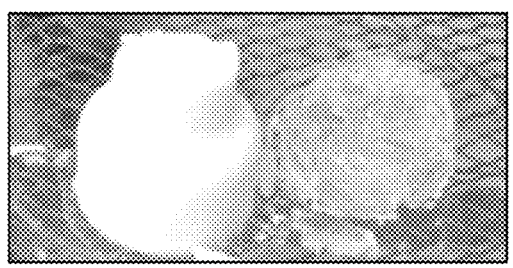
Figure 4F:
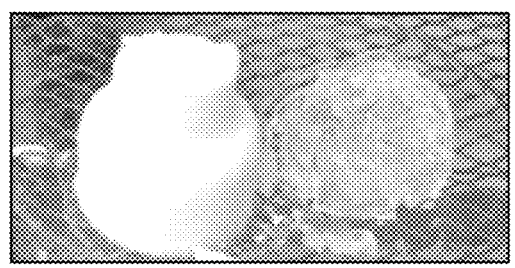
Figure 4G:
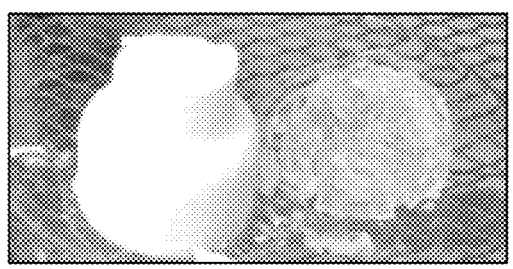
Figure 4H:
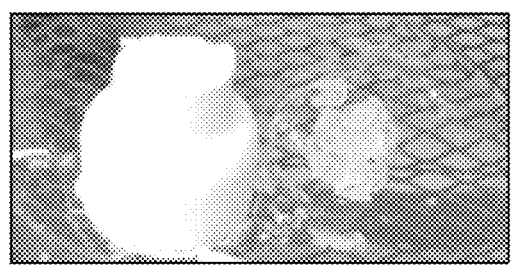

FIGS. 4A-4H illustrate time lapse photos of an Open ADSG (left) (made according to the above described procedure) at different times as it was drying under ambient conditions in comparison with Silbound H5 (Silbond Corporation) being dried under the same ambient conditions. FIG. 4A was taken at Time=0:00 (h:mm). After 40 min, as shown in FIG. 4B, some shrinkage and cracking can be seen in the conventional gel, while the Open ADSG remains unchanged. FIG. 4C was taken after 1 hr 40 min., with no change in the Open ADSG. After 2 hr 20 min, as shown in FIG. 4D, cracking in the conventional gel is more extensive, with no observable changes in the Open ADSG. FIG. 4E was taken at 2 hr 55 min, while FIG. 4F was taken after 3 hr 20 min, with no observable change in the Open ADSG. After 3 hr 50 min, as shown in FIG. 4G, the conventional gel is not only cracked, it has visibly Shrunk in size. After 17 hr 20 min, the conventional gel is not only extensively cracked, it has densified, i.e., shrunken to a considerably degree, while the Open ADSG remains largely the same.

As can be seen, the Open ADSG is not subject to the effect of capillary stresses as is the conventional gel. As such the Open ADSG, upon observation, was able to resist most shrinking and cracking over time, as well as exhibiting no springback, thus remained in substantially the same overall shape while being dried under ambient conditions.

The above-described procedure for producing Open ADSG was repeated several times, with results shown in Table 1 below. In some testing, the wet gel was placed in a bath of ethanol prior to being fully dried. The bath helped to remove unreacted materials and other liquids, soluble solids, or insoluble suspended solids from the drying gel. In Table 1 below, the pore fluid (i.e., solvent) is referred to as a "natent," in the testing without an ethanol bath, while the pore fluid is referred to as "ethanol" in testing with an ethanol bath.

As Table 1 shows, the natent technique resulted in less shrinkage of the macroporous aerogel as compared with the washing technique, although the washing technique still produced a dried macroporous sol gel having reduced shrinkage as compared with conventional aerogels, as shown by the ethanol-washed experiments of Table 1.

TABLE 1

Drying Shrinkage of Open Ambiently Dried Macroporous Sol Gels ("Open ADSG")

| Pore fluid | Wet height | Wet dia | Dry height | Dry dia | % Shrinkage from Wet height | % Shrinkage from Wet dia |
|---|---|---|---|---|---|---|
| Natent | 24.8 | 21.5 | 23.75 | 20.6 | −4.2% | −4.2% |
| EtOH | 23.3 | 21.4 | 21.7 | 20.5 | | |
| EtOH | 22.7 | 21.2 | 20.5 | 20.6 | | |
| EtOH | 23.4 | 21.5 | 21.6 | 20.5 | | |
| EtOH | 22.6 | 21.6 | 23.2 | 20.7 | | |
| EtOH (avg) | 23 | 21.43 | 21.75 | 20.6 | | |
| | | | | | −5.4% | −4% |

(All four samples were mixed during washing-use average values below)

Surface area and pore size distribution were measured via nitrogen adsorption using a Micromeritics model ASAP 2020, with the average pore size being the most numerous pore size representative of the gel.

Table 2 below shows the surface area and average pore size for the dried macroporous sol gel produced under the conditions described above, in comparison with values common to conventional aerogels which have been supercritically dried.

TABLE 2

Surface Area and Average Pore Size Comparisons

| Property | Silbound H5 | Open ADSG |
|---|---|---|
| Surface Area (m²/g) | 500-1000 | 104 |
| Average Pore Size (nm) | 5-30 | 2.5 |

Figure 5:
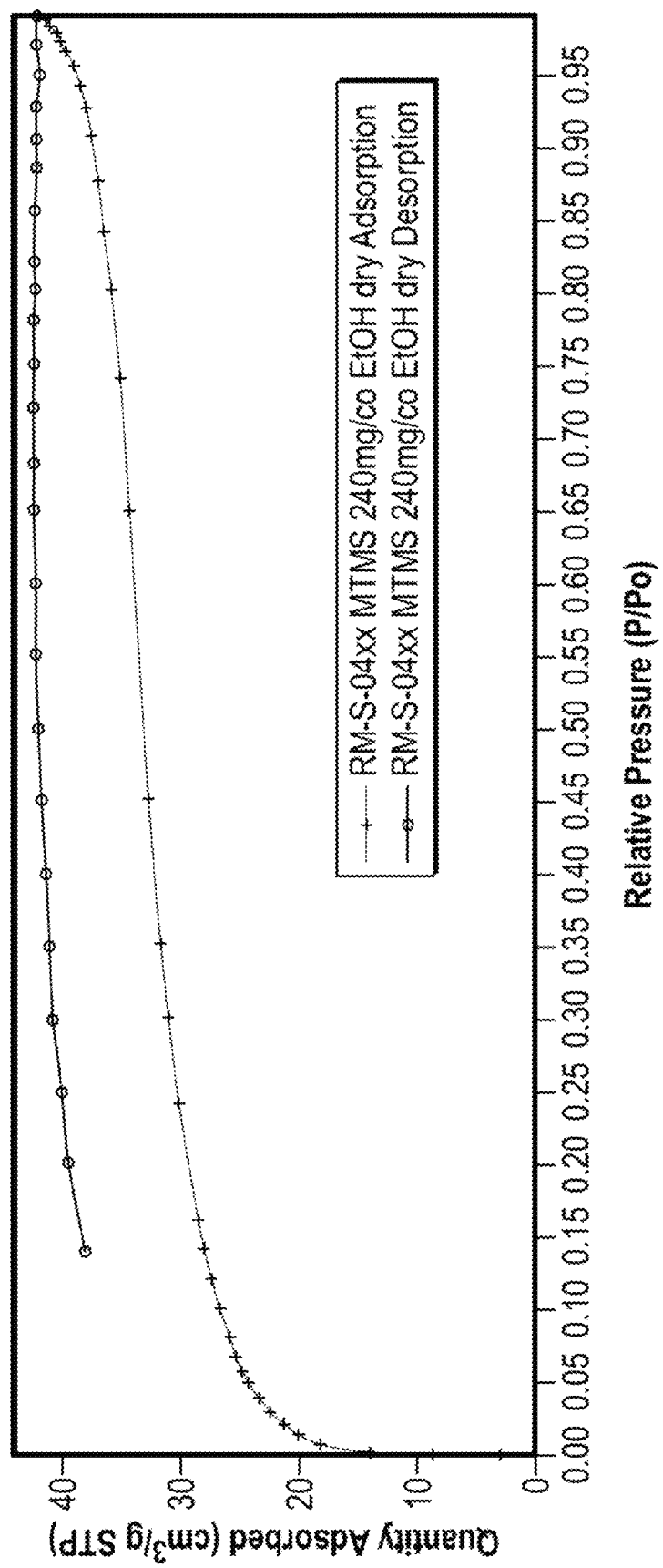
FIG. 5 is a nitrogen adsorption isotherm plot of an open ambiently dried porous sol gel according to an embodiment.
Figure 6:
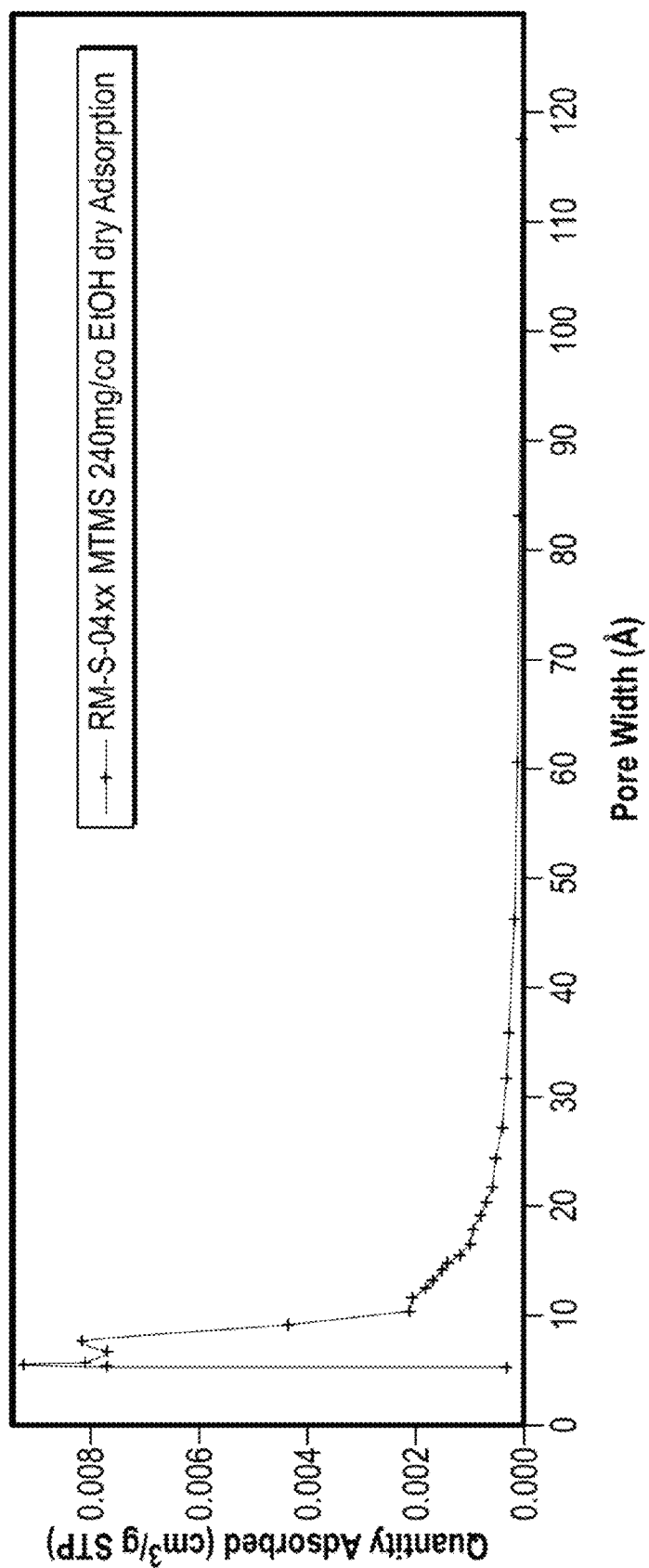
FIG. 6 is a nitrogen adsorption Horvath-Kawazoe Differential Pore Volume Plot of an open ambiently dried porous sol gel according to an embodiment.

See also FIG. 5 which shows a nitrogen gas adsorption plot, from which surface area and pore size values can be extrapolated. FIG. 6 shows a pore size distribution plot with the horizontal axis scaled so as to zoom in on the smaller pore size region. However, neither of FIG. 5 or 6 are considered representative images due to some technical problems with the nitrogen adsorption unit used (Micromeritics model ASAP 2020) and the fact that the pores were macropores.

As can be seen from these results, the average pore size appears to be quite small, around 2.5 nm. However, nitrogen adsorption cannot measure pores above a couple hundred nanometers in diameter. SEM images reveal the actual average pore size to be quite large, on the order of micrometers.

Figure 7:
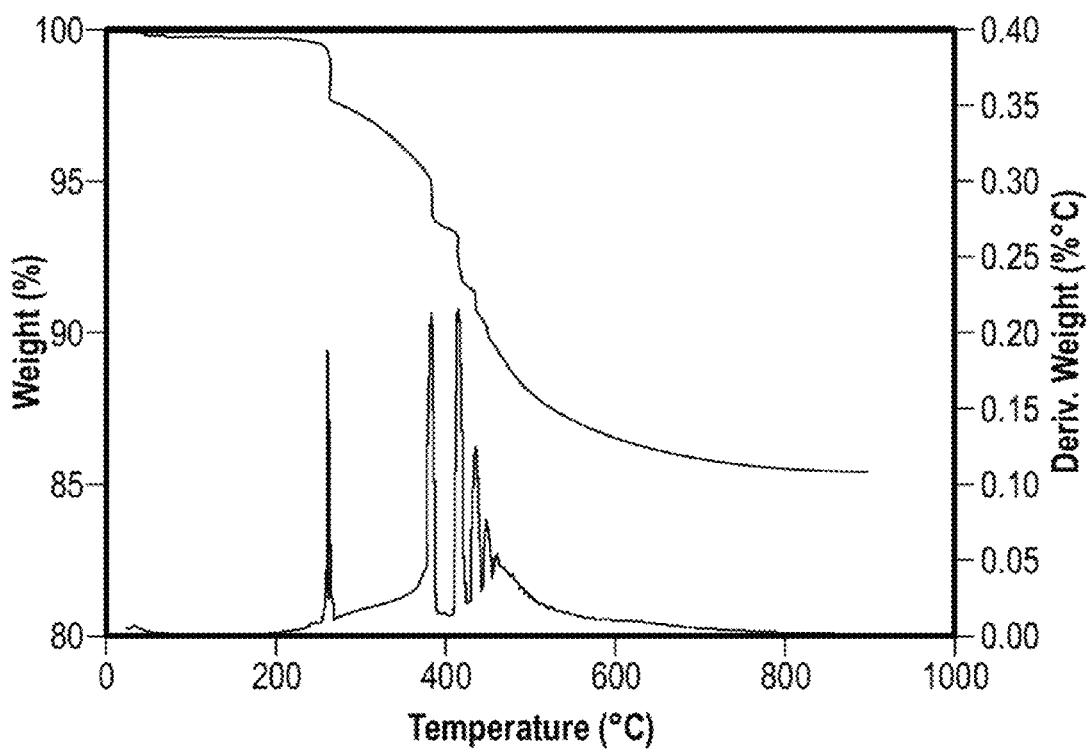
FIG. 7 shows thermogravimetric data for an open ambiently dried porous sol gel according to an embodiment.
Figure 14:
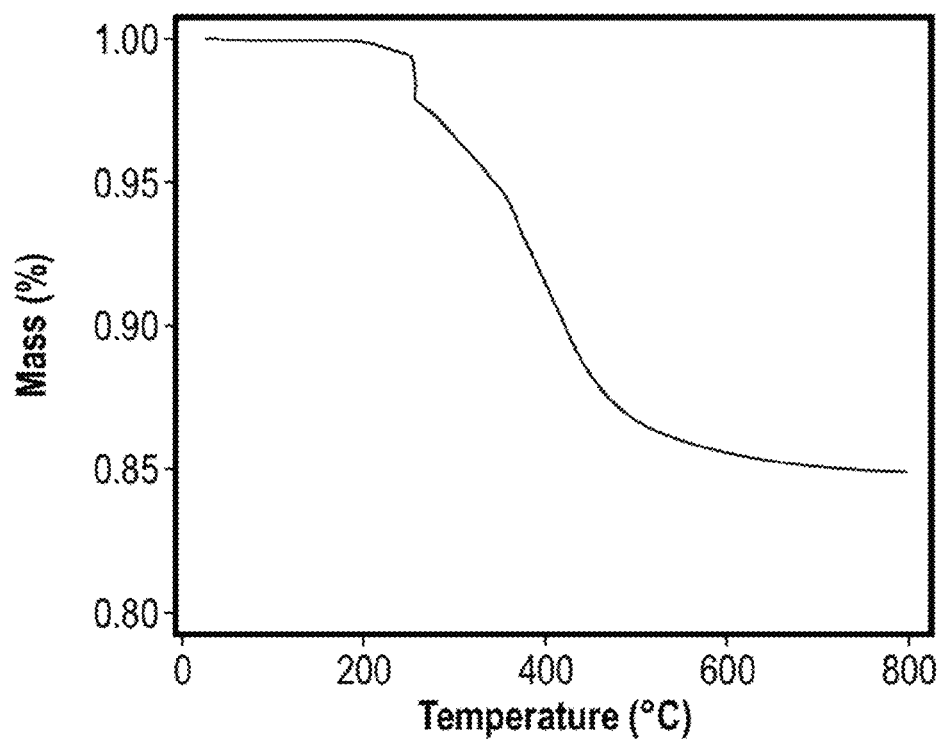
FIG. 14 is a plot of thermogravimetric data for an open ambiently dried porous sol gel according to various embodiments.

Thermogravimetric data was also obtained using a TA Instruments Q500. FIG. 7 shows that the Filled ADSG is stable at high temperatures, losing less than 15% of its mass, even at temperatures as high as 900° C. The steps seen in the data between approximately 250° C. and 500° C. could be residual pore fluid left in the pores which is evaporating during the test. FIG. 14 is another measurement on a similar sample to that measured in FIG. 7 but the gel has been allowed to dry longer. As can be seen in FIG. 14, the steps are now gone.

Figure 8:
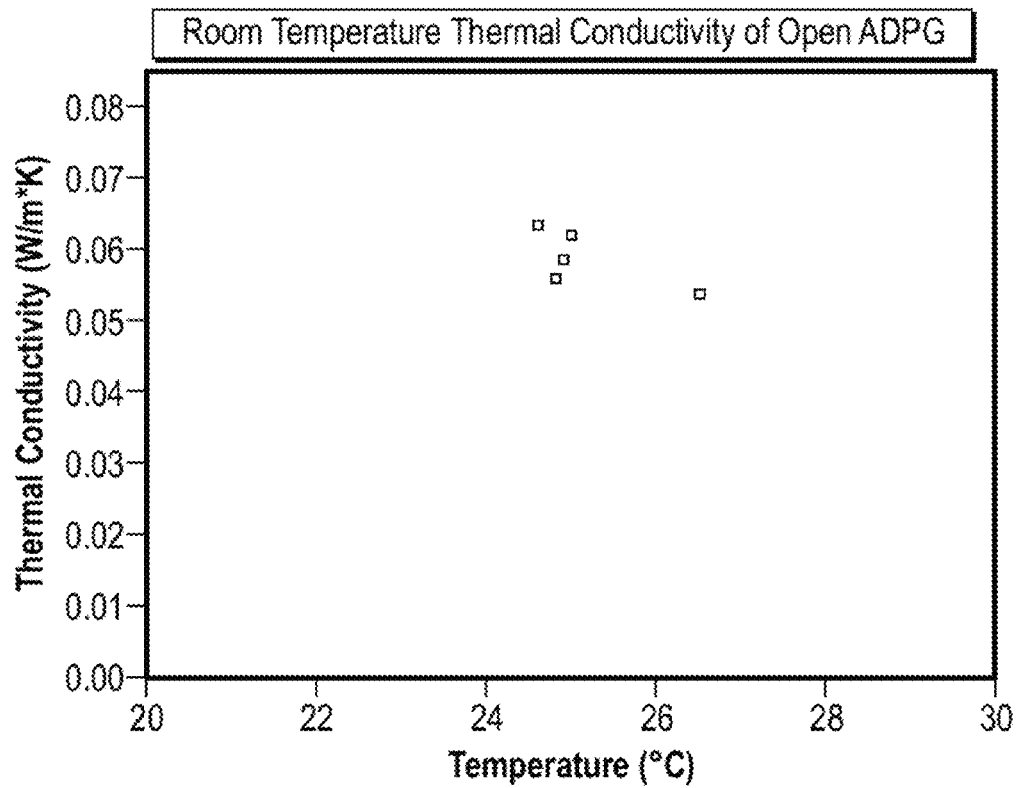
FIG. 8 is a graph showing thermal conductivity of open ambiently dried porous sol gels according to various embodiments.

Thermal conductivity data was also obtained using Netzsch LFA 447 Xenon Flash System. FIG. 8 shows that the Open ADSG possesses nominal thermal conductivity of 0.06 W/m*K at room temperature, making these materials excellent insulators.

Figure 9A:
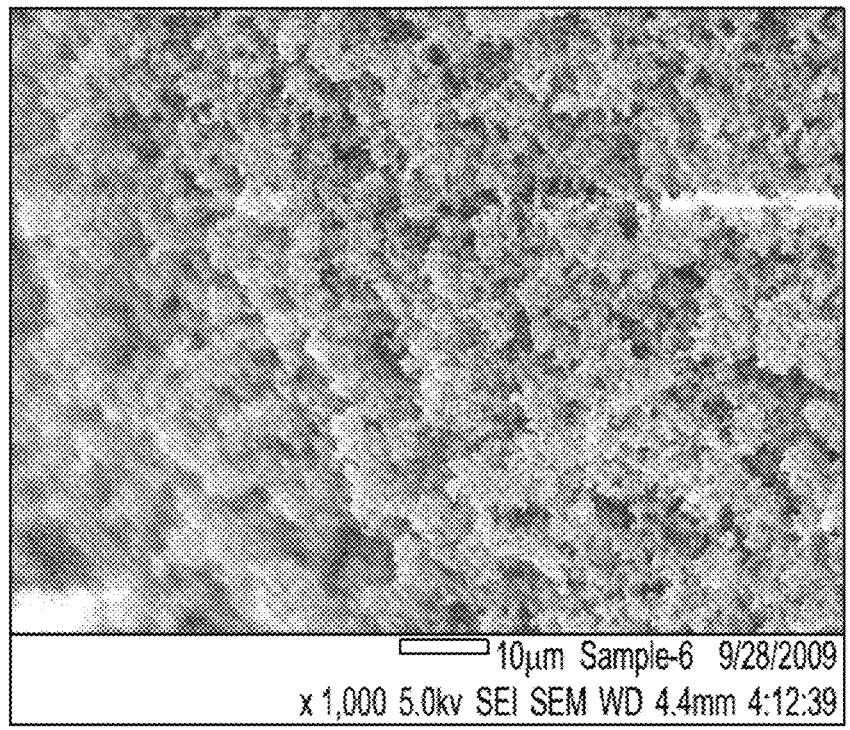
FIG. 9A is a scanning electron microscope (SEM) image of a supercritically dried open aerogel which inadvertently includes mesoporous pores.
Figure 9B:
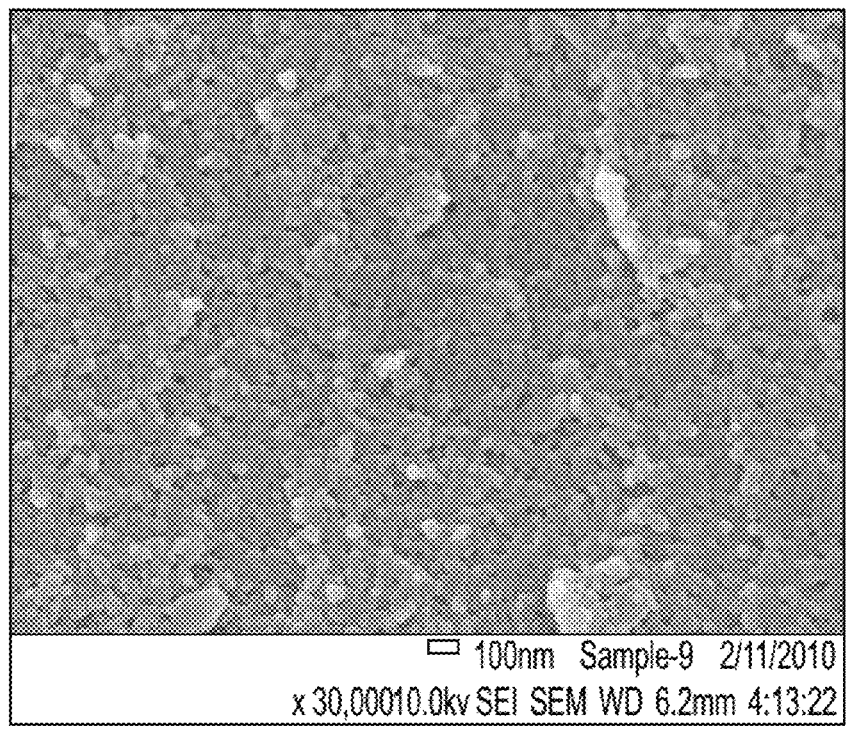
FIG. 9B is a scanning electron microscope (SEM) image of a supercritically dried open conventional aerogel.

SEM images were obtained using JEOL 7500F SEM. While FIG. 9A is an image of a supercritically dried open aerogel containing both mesopores, it is not representative of conventional supercritically dried open aerogel and, further, was not reproducible. However, FIG. 9B is considered an accurate representation of a prior art gel (made according to the process described in Maloney R, Sakamoto J., Large deformation of chlorotrimethylsilane treated silica aerogels. Journal of Non-Crystalline Solids. 2011;357(10):2059-2062). As can be seen, the prior art gel shown in FIG. 9B lacks the repeating pattern of substantially spherically-shaped solids as provided in the various embodiments described herein.

Figure 10:
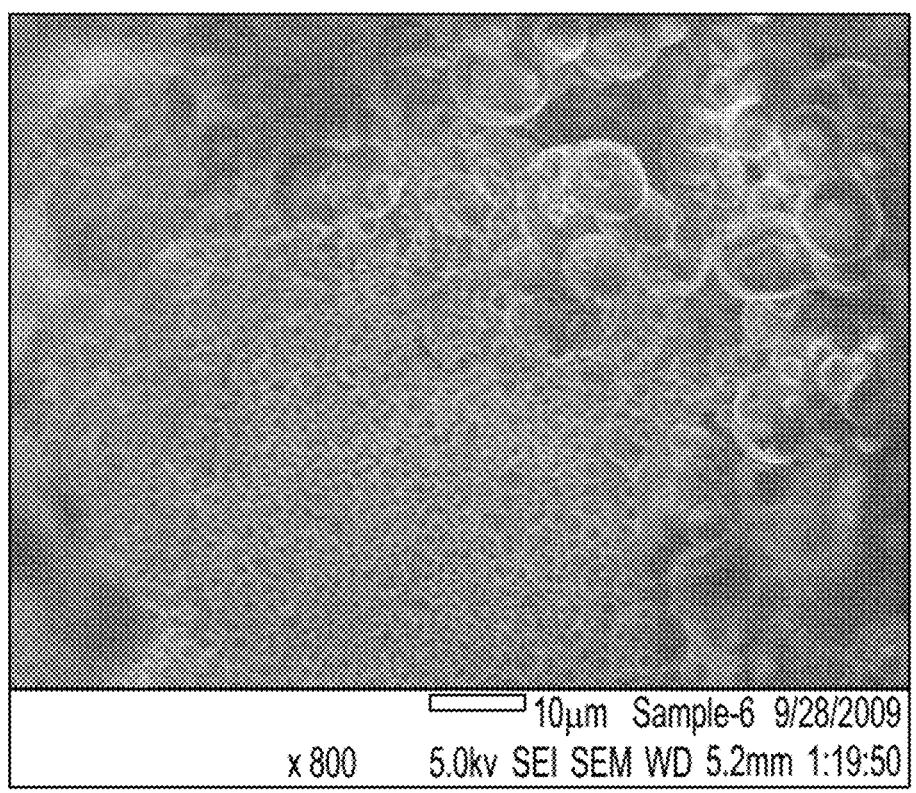
FIG. 10 is a SEM image of an open ambiently dried porous sol gel according to an embodiment.

FIG. 10 is a SEM image of an open ambiently dried porous sol gel made according to the method described herein.

Figure 11:
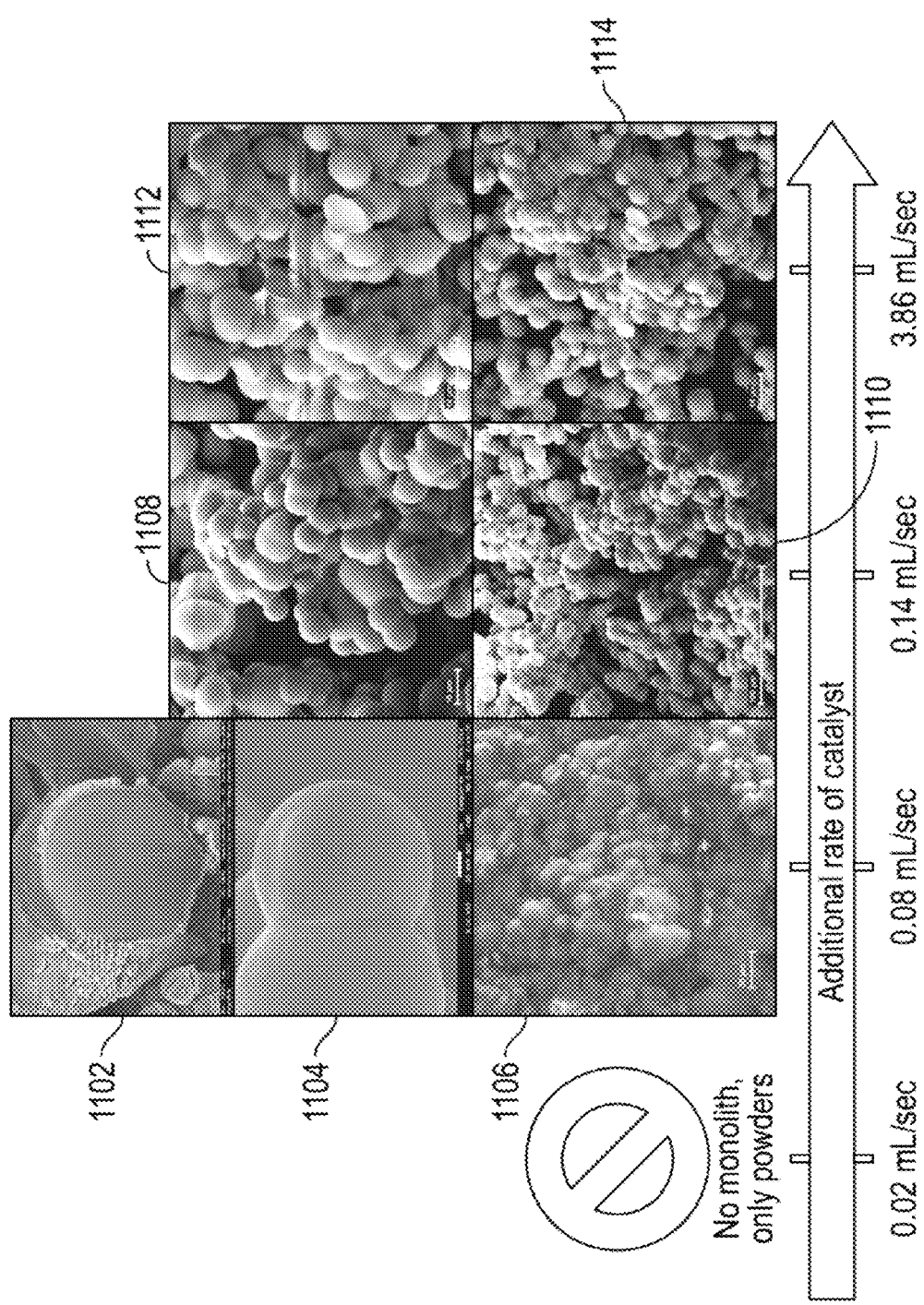
FIG. 11 are SEM images of open ambiently dried porous sol gels made using different rates of catalyst addition according to various embodiments.
Figure 12A:
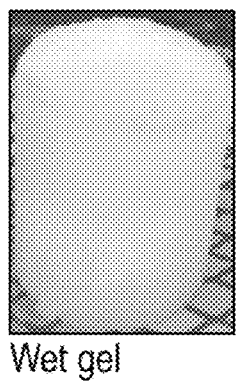
FIGS. 12A-12H are time lapse images of open porous sol gels being ambiently dried according to an embodiment.
Figure 12B:
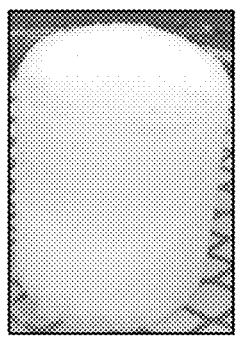
Figure 12C:
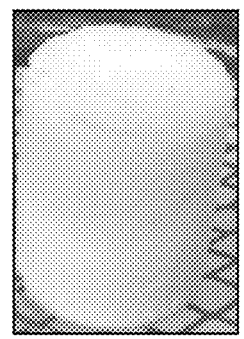
Figure 12D:
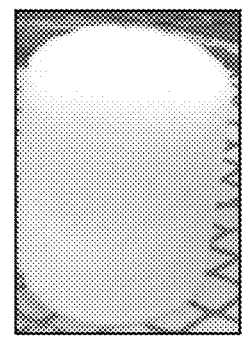
Figure 12E:
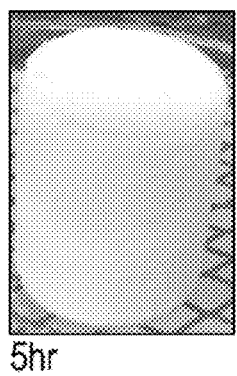
Figure 12F:
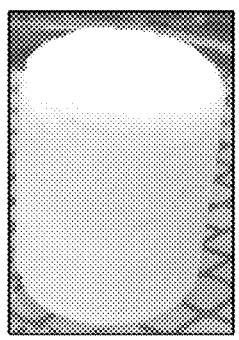
Figure 12G:
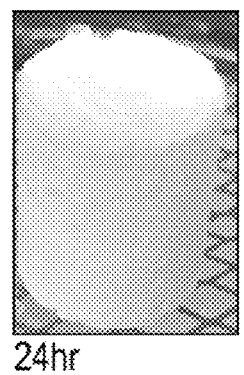
Figure 12H:
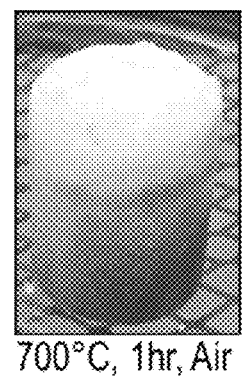

Referring to FIG. 11, at the addition rate of 0.08 mL/sec. SEM micrographs 1102, 1104 and 1106 of the Open ADSG show various features. Specifically, SEM micrograph 1102 (Cal Zeiss EVO LS25 Variable Pressure SEM "EVO") for Filled ADSG shows representative particle sizes. SEM micrograph 1104 (JEOL JSM 7500F SEM "7500") shows a fracture on the surface on the Filled ADSG. SEM micrograph 1106 taken on Carl Zeiss Auriga Cross-Beam FIB-SEM with a gallium focused ion beam "FIB" after ion beam milling Shows no internal porosity of the spherically shaped solids which make up the Open ADSG pearl necklace structure.

Figure 13:
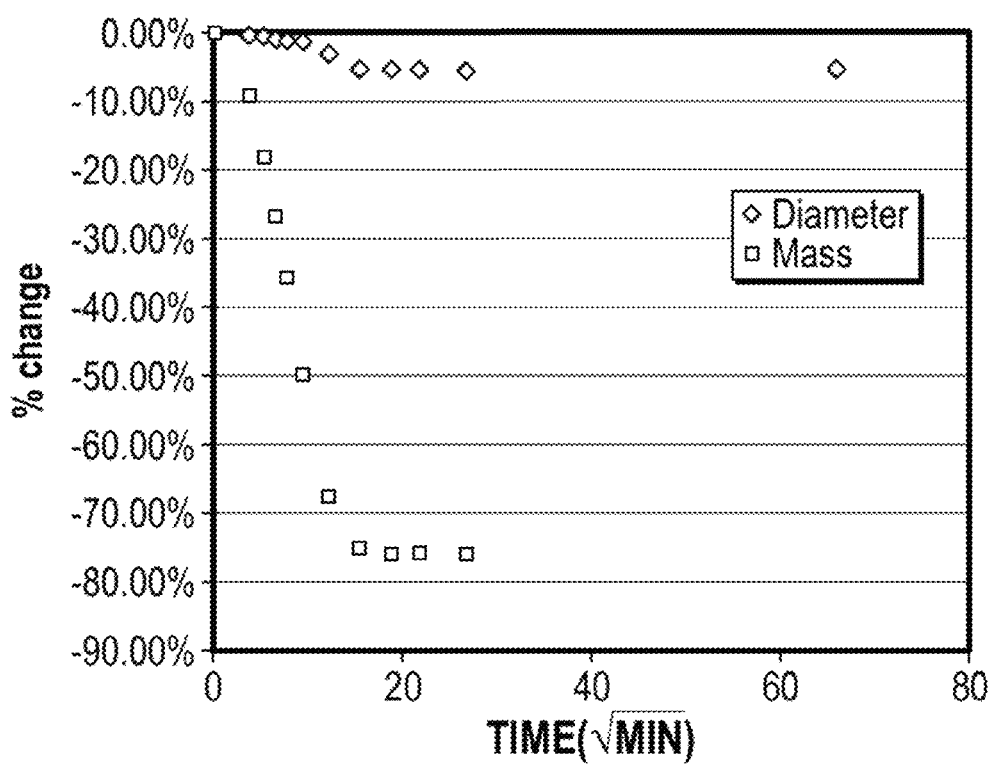
FIG. 13 is a graph showing average diameter changes and mass loss from a wet sol gel over time for open ambiently dried porous sol gels according to various embodiments.

FIG. 13 is a graph showing average diameter changes from the wet gel over time (n=2), as it dried to produce the Open ADSG similar to those shown in FIG. 12A-12H. The gradient in discoloration of the heated sample is due to presence of oxygen during heating, as the white section was closer to the open end of the quartz tube in which the sample was heated. Mass measurements of the samples were made on a Sartorius A200S Electronic Analytical Balance. As can be seen, the shrinkage occurs in three stages. Up to 90 minutes, bulk pore fluid is evaporating from large pores, resulting in minimal shrinkage. From 90 min to 4 hours, residual pore fluid is evaporating from smaller pores where capillary forces are greater, causing the bulk of the shrinkage. After 4 hours, drying is complete. The gels are limited to 6% linear and 15 vol % shrinkage, and did not undergo "spring-back." Samples were heated in a Thermo Scientific Lindberg Blue M tube furnace in an alumina tube at a rate of 1° C./min, held for 4 hrs, then cooled at a rate of 100° C./min in 1 atm of air. The dimensional measurements were made on a home-built load frame with a 10 lb (4.5 kg) load cell (loadstar sensors model TUF-010-050-A, 0.5% accuracy) and linear actuator (Newport model LTA-HL, resolution=0.0074 microns). Displacements were taken at a force of ~0.05 N for every point.

Figure 15:
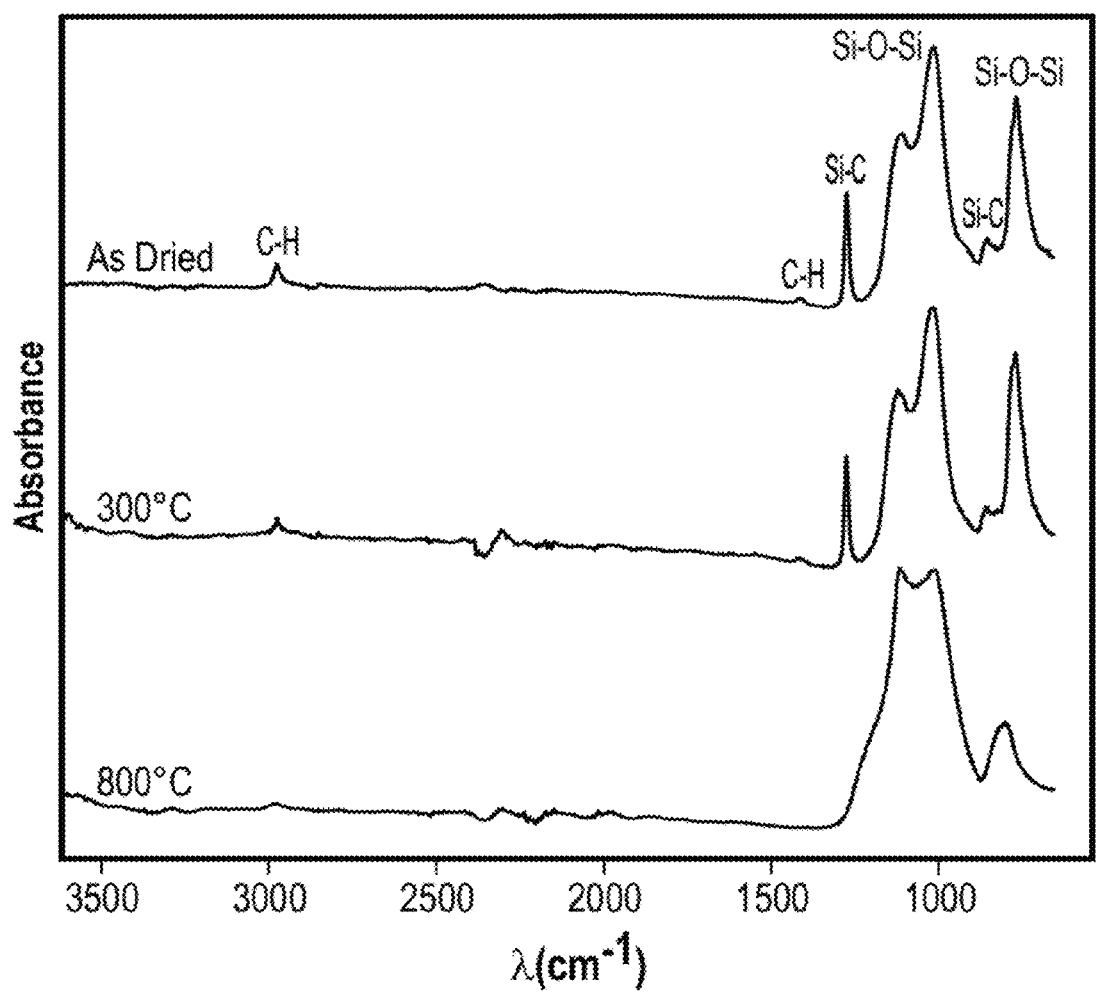
FIG. 15 is FTIR spectrum showing loss of Si—C surface groups between 300 and 800° C. for open ambiently dried porous sol gels according to various embodiments.

FIG. 15 is an FTIR spectrum of the Open ADSG showing that the mass loss between 300° C. and 800° C. is largely due to oxidation of surface methyl groups, as evidenced by the loss of the Si—C peak.

The intrinsic high temperature thermal stability was measured and is shown in Table 3. Samples were heated in a Thermo Scientific Lindberg Blue M tube furnace in an alumina tube at a rate of 1° C./min, held for 4 hrs, then cooled at a rate of 100° C./min in 1 atm of air. The dimensional measurements were made on a home-built load frame with a 10 lb (4.5 kg) load cell (loadstar sensors model TUE-010-050-A, 0.5% accuracy) and linear actuator (Newport model LTA-HL, resolution=0.0074 microns). Displacements were taken at a force of 0.05 N for every point.

TABLE 3

Intrinsic High Temperature Thermal Stability of Open ADSG

| State | Temp (° C.) | % Diameter Change |
|---|---|---|
| Wet to dry | 25 | −4.35 |
| Wet to 300° C. | 300 | −5.4 |

EXAMPLE 4

Filled Ambiently Dried Porous Sol Gel ("Filled ADSG")

A silane solution (e.g., FIG. 1A, 104) was prepared in a jar by placing 3.93 mL of methyltrimethoxysilane (MTMS, 98% 246174 from Sigma-Aldrich) and was labeled sol. In another vial, a catalyst solution (e.g., FIG. 1A, 102) was prepared by mixing 3.904 mL of methanol (methyl Alcohol, anhydrous 3041-10 from Macron Chemicals), 0.608 mL of aqueous ammonium hydroxide (Ammonium hydroxide solution. ACS reagent, 28-30% NH3 basis, 320145 from Sigma-Aldrich), and 1.559 mL of reverse osmosis water were mixed and labeled cat. To a third jar was added titania powder (100 mg/cc TiO$_7$, 200 nm from Inframat Advanced Materials product number 22N-0811R), fumed silica (5 mg/cc amorphous silicon (IV) oxide, 85-115 m^2/g, −325 mesh from Alfa Aesar stock #42737), silica powder (20 mg/cc, silicon (IV) oxide, 99.5%, −400 mesh 2 micron APS powder, 2 m^2/g from Alfa Aesar #13024), and zirconia fibers (ZrO2 zirconia bulk fiber type ZYBF-2 from Zircar Zirconia, Inc. used as received).

The catalyst solution (e.g., 102) was added to the silane solution (e.g., 104) with stirring. The addition rate was 3.86 mL/sec. When all the catalyst solution (e.g., 102) had been added, the precursor solution catalyst/silane solution mixture, FIG. 1B, 106 was stirred for 10-30 seconds. The precursor solution (e.g., 106) was poured into the third vial containing the forming powders/fibers (e.g., 108). Using a probe-tip sonicator, the components were sonicated for about 30 seconds, dispersing the powders/particles (e.g., 108) to form a milky white appealing wet mixture (e.g., FIG. 1B, 110). The wet mixture (e.g., 110) was poured into a mold (e.g., FIG. 1B, 112 and FIGS. 3A-3E) and covered to prevent drying. The wet mixture 110) was allowed to set in the mold (e.g., 112) for 15 minutes, until a wet sol gel (e.g., FIG. 1B, 116) was formed. The wet sol gel (e.g., 116) was allowed to age for between about 24 hours and 72 hours to produce aged wet sol gel. Care was taken to prevent the net gel (e.g., 116) from drying out by placing in a sealed container, which included both plastic bags and containers.

Samples were then removed from the mold prior to drying as in Example 1.

The samples with zirconia fibers were heated in a Thermo Scientific Lindberg Blue M tube furnace in an alumina tube at a rate of 1° C./min, held for 4 hrs, then cooled at a rate of 100° C./min in 1 ATM of air.

Table 4 shows the dimensional change as a function of temperature for the Filled ADSG.

TABLE 4

Thermal Stability of Filled ADSG up to 1000° C.

| Conditions (wet to ° C.) | Temperature (° C.) | % diameter change |
|---|---|---|
| Wet to dry | 25 | −2 |
| Wet to 300 | 300 | −2 |
| Wet to 500 | 500 | −8 |
| Wet to 800 | 800 | −10 |
| Wet to 1000 | 1000 | −12 |

The addition of reinforcing fibers allows bulk monoliths to be stable to much higher temperatures. With the addition of zirconia fibers, there is no additional dimensional change in the monoliths from the as-dried state up to 300 under these test conditions. The point at 25° C. is the wet-to-dry dimensional change and all other points are referenced to the wet diameter.

Figure 17:
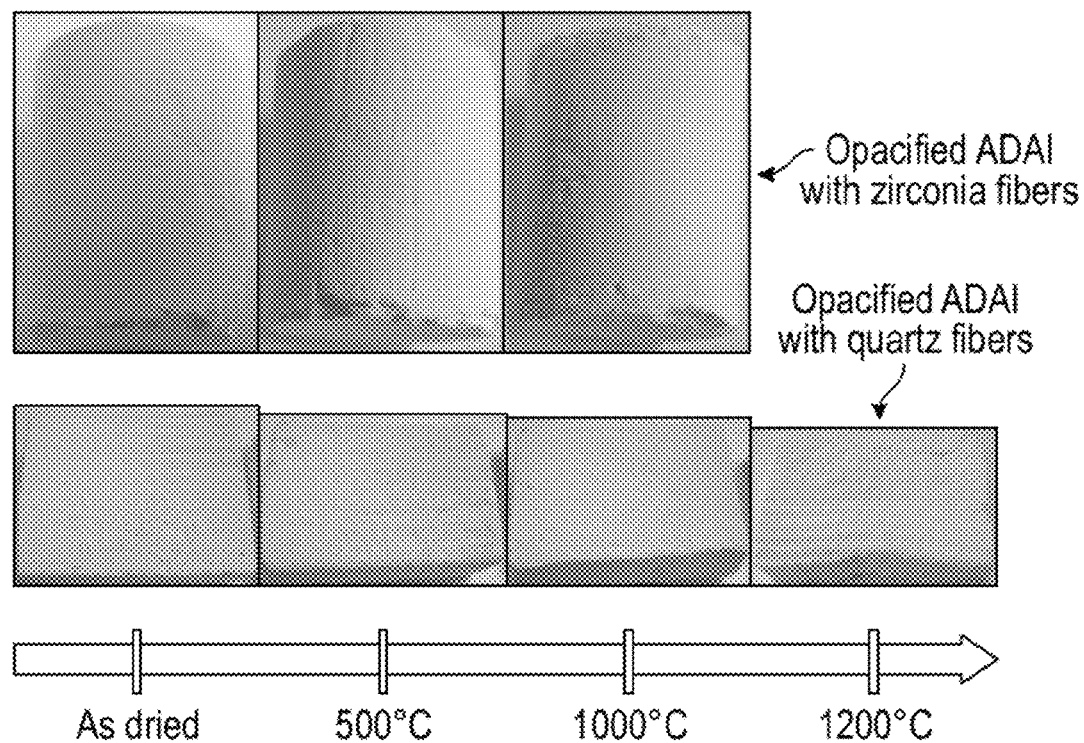
FIG. 17 contains images of zirconia-filled (top) and quartz-filled (bottom) ambiently dried porous sol gels over increasing temperatures according to various embodiments.

FIG. 17 shows that the samples did not significantly deform or discolor. As such filled ADSG with zirconia fiber-reinforcing schemes are stable at high temperatures up to at least 1000 C.

Figure 18A:
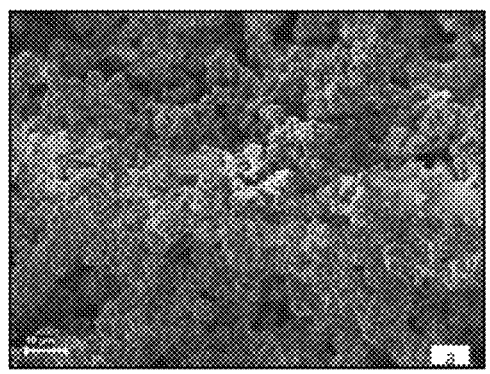
FIGS. 18A-18D are SEM images of quartz-filled (A, B) and zircon (C, D) ambiently dried porous sol gels after various heat treatments according to various embodiments.
Figure 18B:
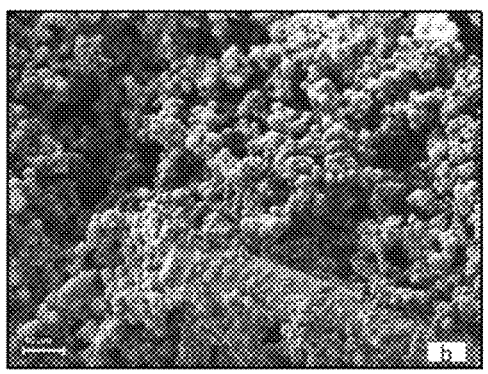
Figure 18C:
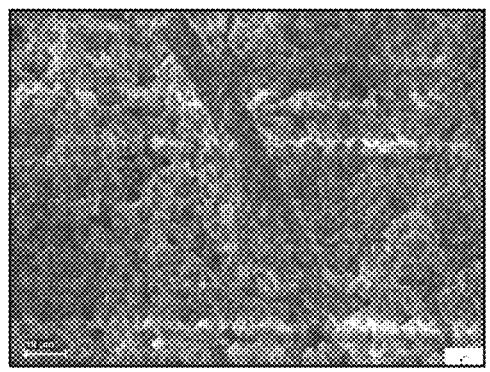
Figure 18D:
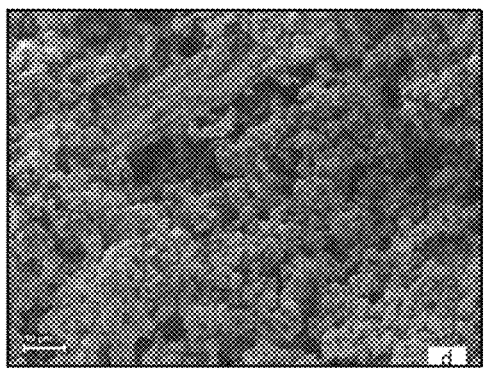

FIG. 18C is an SEM image of a Filled ADSG with 25 mg/cc zirconia fibers after exposure to 500° C. for 4 hrs. FIG. 18D is an SEM image of Filled ADSG with 25 mg/cc zirconia fibers after exposure to 1000° C. for 4 hrs.

As can be seen, the microstructure for Filled ADSG is stable to at least 1000° C. There appears to be good interaction of the ADSG to zirconia fibers. Images were selected so that fibers were present.

Figure 19:
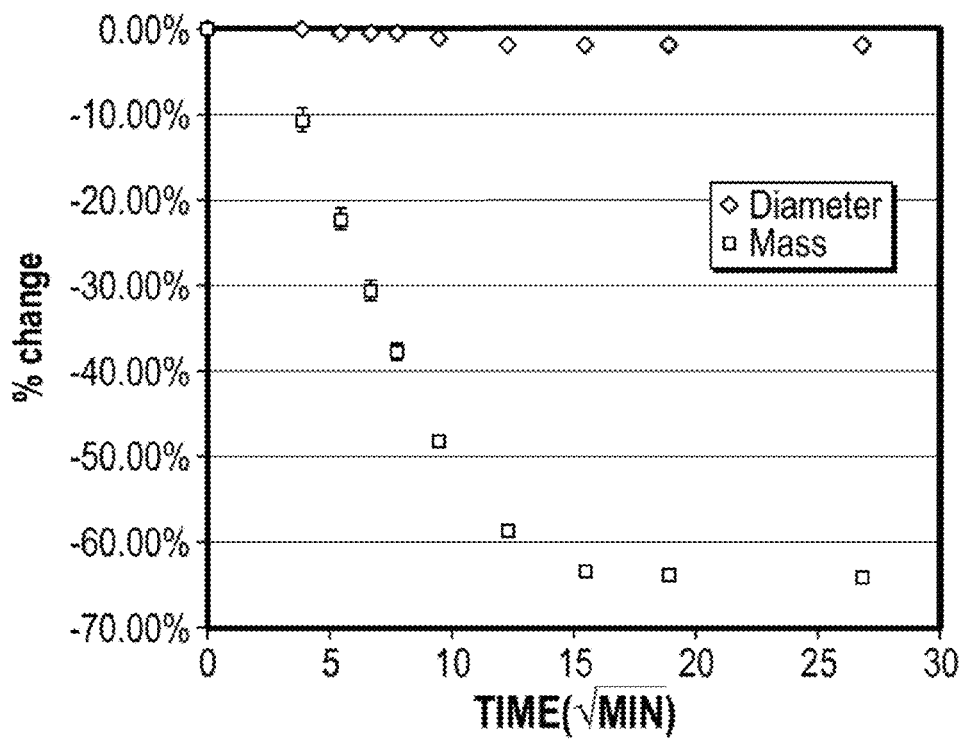
FIG. 19 is a graph showing average dimensional and mass changes from as cast to thy for filled ambiently dried porous sol gels according to various embodiments.

FIG. 19 shows dimensional and mass change from as cast to dry for Filled ADSG with zirconia fiber reinforcement. The Filled ADSG zirconia fibers have a similar mass loss to the Open ADSG. Comparing the Open ADSG to the Filled ADSG, the diametric change was reduced by ~60% from −5.25% for Open ADSG to −1.87% for Filled ADSG at 12 hrs.

EXAMPLE 5

Filled Ambiently Dried Non-Microporous Sol Gel ("Filled ADSG")

Filled Ambiently Dried Non-Microporous Sol Gel ("Filled ADSG") was made according to the method described in Example 4 but with quartz fibers (20 mg/cc, quartzel low density quartz felt from Saint-Gobain Quartz rather than silica fibers. The felt was baked Out at 600° C. for 2 hrs to remove the polyvinyl acrylate (PVA) binder before use) was used instead of the zirconia fibers.

The samples with quartz fibers were heated in a Carbolite model RHF 15/3 box furnace on an alumina stand-off at a rate of 1° C./min, held for 4 hrs, then cooled at a rate of 10° C./min. FIG. 17 shows that the samples did not significantly deform or discolor. As such Filled ADSG with quartz fiber-reinforcing schemes is remarkably stable at high temperatures. Stability at 1200° C. in air was previously not achievable with silica aerogels. These images also show that there is no macroscopic change to the monoliths up to 1000° C. and there are minimal changes at 1200° C.

FIG. 18A is an SEM image of Filled ADSG with 20 mg/cc quartz fibers after exposure to 500° C. for 4 Ins. FIG. 18B is an SEM image of a full ADSG with 20 mg/cc quartz fibers after exposure to 1000° C. for 4 hrs. As can be seen, the microstructure for Filled ADSG is stable to at least 1000° C. There appears to be good interaction of the ADSG to the quartz fibers. Images were selected so that fibers were present.

EXAMPLE 6

Open Ambiently Dried Non-Microporous Sol Gel ("Open ADSG")

Open Ambiently Dried Non-Microporous Sol Gel ("Open ADSG") was made according to the method described in Example 4 but no fillers were used.

The samples were subjected to heat treatment in a Thermo Scientific Lindberg Blue M tube furnace in an alumina tube at a rate of 1° C./min held for 4 his and then cooled at a rate of 100° C./min in 1 atm of air. Imaging was performed on a Cal Zeiss EVO LS25 Variable Pressure SEM.

Figure 16A:
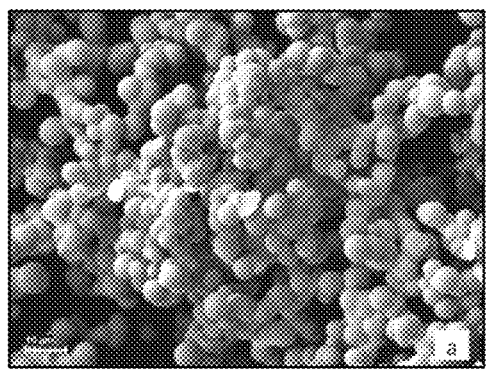
FIG. 16A-16D are SEM images of open ambiently dried porous sol gels after heat treatments according to various embodiments.
Figure 16B:
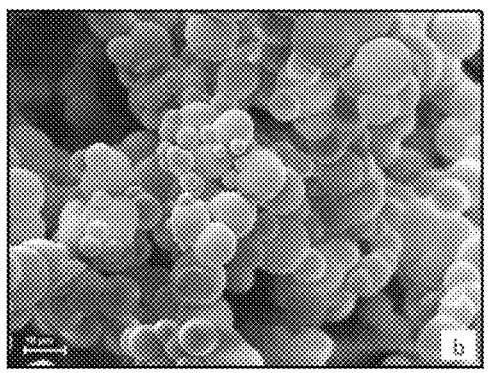
Figure 16C:
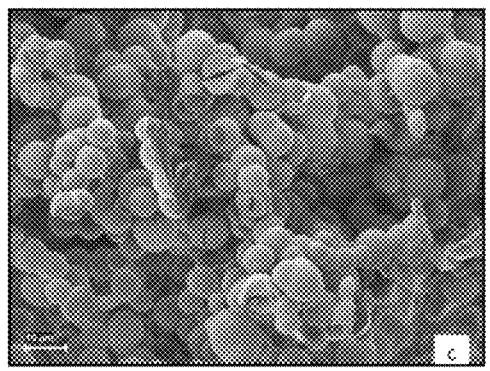
Figure 16D:
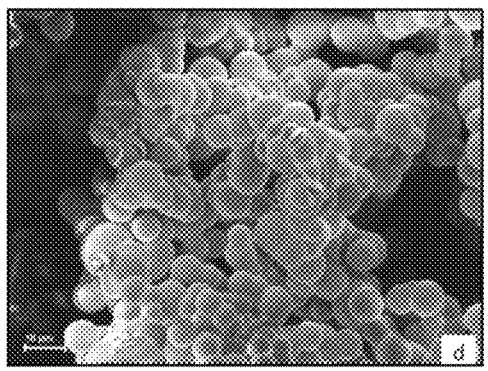

FIG. 16A is an SEM image of an Open ADSG without heat treatment. FIG. 16B is all SEM image of an Open ADSG after a heat treatment at 300° C. FIG. 16B is an SEM image of an en ADSG after a heat treatment at 500° C. FIG. 16B is an SEM image of an Open ADSG after a heat treatment at 800° C.

As can be seen, the microstructures show that the Filled ADSG structure is stable in air to at least 300° C., after which, the spheres making up the pearl necklace structure begin to fracture. There is not much evidence for sintering in either an increase in particle-to-particle necking or in a significant increase in particle size. This suggests that bulk monoliths of Open ADSG could be made to be more thermally stable with fiber reinforcing schemes.

EXAMPLE 7

Open Ambiently Dried Non-Microporous Sol Gel ("Open ADSG")

Open Ambiently Dried Non-Microporous Sol Gel ("Open ADSG") was made according to the method described in Example 6 but the addition rate was 0.14 mL/sec instead of 3.86 mL/sec.

Referring to FIG. 11, at the rate of 0.14 mL/sec, SEM micrographs 1108 and 1110 of the Filled ADSG show various features. Specifically, SEM micrograph 1108 (EVO) shows representative particle sizes. SEM Micrograph 1110 provides a higher magnification of the image in SEM micrograph 1108.

EXAMPLE 8

Open Ambiently Dried Hybrid Aerogel ("Open ADHA") with Surface Modification

An open ambiently dried hybrid aerogel was made by a method similar to the method Shown in FIG. 2, which included combining 2.38 mL of Silbond H5 (www.silbond.com) and 2.38 mL of 200 proof ethanol in a jar, which was labeled as "sol." In another jar, 1.66 mL of 200 proof ethanol, 3.57 mL of reverse osmosis water, and 0.01 mL of aqueous ammonium hydroxide (Ammonium hydroxide solution, ACS reagent, 28-30% NH3 basis, 320145 from Sigma-Aldrich) was mixed and labeled "cat." The cat jar was added dropwise to the sol jar. Before the sol could gel, the mixture was cast on top of Open ADSG in a mold. The mixture was allowed to permeate the Open ADSG pores by gravity. Once the mixture was finished permeating, the wet hybrid was placed in a sealed container (bag) and aged for 3 days.

Thereafter, a solvent exchange step was performed to replace the mother pore fluid with ethanol. After one day, the ethanol was exchanged with a solvent, namely an ethanol/chlorotrimethylsilane (CTMS) solution, and surface modification was allowed to occur. During surface modification, hydroxyl functional groups present on the surface were chemically replaced with methyl functional groups by the CTMS. The ethanol/CTMS solution was solvent exchanged with ethanol and allowed to ambiently dry to produce Open ADHA having surface modification as described herein.

Figure 21A:
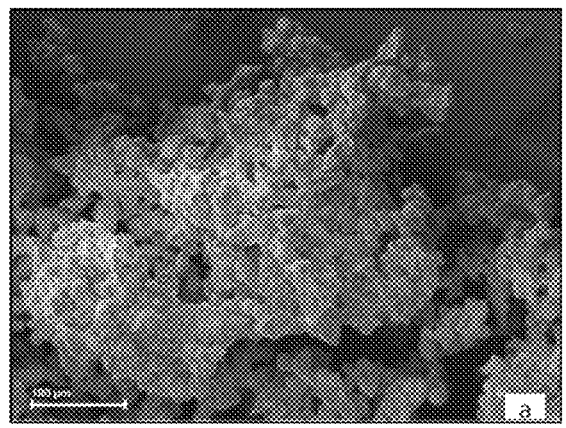
FIGS. 21A-21C are SEM images of an open ambiently dried hybrid aerogel with surface modifications according to various embodiments.
Figure 21B:
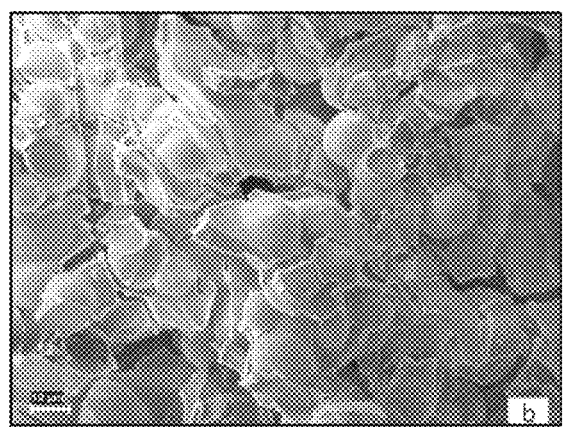
Figure 21C:
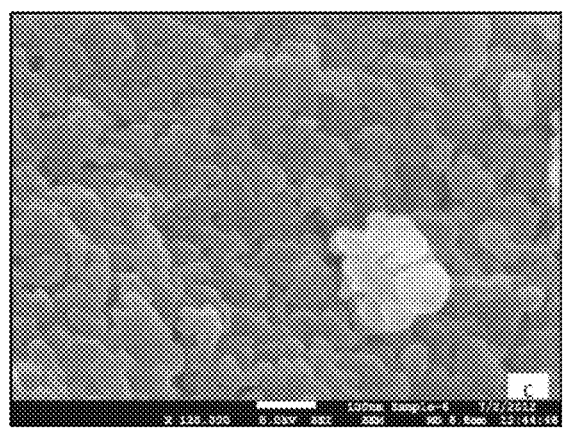

FIGS. 21A-21C show the samples under different magnifications (macrostructure control and mesostructure control). Specifically, the SEM micrograph in FIG. 21A is a low magnification micrograph (EVO) of an as dried hybrid aerogel. FIG. 21B is a higher magnification micrograph (EVO) of the image in FIG. 21A. As can be seen, the pores of the Open ADSG from Example 6 are now substantially filled with a second solid network to form the hybrid. FIG. 21C provides a high resolution SEM micrograph (7500) of the second solid network showing mesoporosity.

The surface area and pore size distribution were obtained by nitrogen adsorption with a Micromeretics model ASAP 2020. BET surface area of hybrid is given in Table 5 and shows that the flanges connecting the spheres together are porous as would be expected in an aerogel and not dense as would be expected in a xerogel. The SEM images in FIGS. 20B and 20C show the mesoporosity measured by the nitrogen adsorption measurement shown in the table.

TABLE 5

| Surface Area and Average Pore Size Comparisons | | |
|---|---|---|
| Property | Silbound H5 | Open hybrid ADHA |
| Surface Area (m²/g) | 500-1000 | 214 |
| Average Pore Size (nm) | 5-30 | 4.5 |

EXAMPLE 9

Open Ambiently Dried Hybrid Aerogel ("Open ADHA") without Surface Modification

An open ambiently dried hybrid aerogel was made by a method similar to the method described in Example 8, but no surface modification or solvent exchanges were performed.

Figure 22:
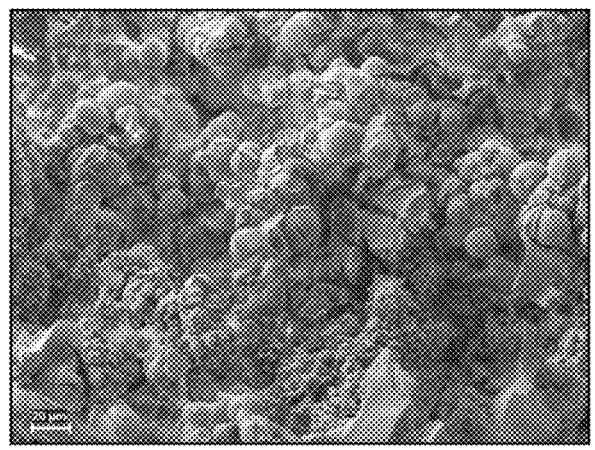
FIG. 22 is an SEM image of an open dried hybrid aerogel without surface modifications according to an embodiment.

FIG. 22 shows an SEM micrograph of the Open ADAH without surface modification. Specifically, the SEM micrograph in FIG. 22 is a low magnification micrograph (EVO) of an as dried hybrid aerogel. As can be seen, the pores of the Open ADSG from Example 6 are now substantially filled with a second solid network to form the hybrid. Even though surface modification was not performed, the shrinkage of the second mesoporous solid network is minimal.

EXAMPLE 10 (PROPHETIC)

Further testing of the hybrid materials will include measuring thermal conductivity. It is expected that such materials will exhibit even lower gas convection than the materials described in Examples 1-8.

Filled hybrid aerogels will also be produced and tested.

Further testing will also include optimization of the ageing tune.

Testing of the hydrophobicity of the dried porous gels will be performed by measuring the contact angle.

The various embodiments can further comprise producing a gelled or wet sol gel which can be dried by any suitable means.

Various embodiments also provide a method of forming a dried porous sol gel comprising forming a sol gel from a sol gel-forming, composition comprising a silane solution and a catalyst solution; and non-supercritically drying the sol gel to provide a dried porous sol gel having no springback. The forming step can include adding the catalyst solution to the silane solution at a rate of at least 8% catalyst solution volume per second. Various non-supercritical drying conditions can be used, including ambient conditions.

In one embodiment, silane in the silane solution has a chemical structure of ASi(OX)(OY)(OZ), wherein A, X, Y, and Z are independently selected from C1-C5 alkyl, such as methyltrimethoxysilane and the silane solution can further comprise a silane solution solvent.

In one embodiment, the catalyst solution comprises a base, water and solvent, and is added to the silane solution at a rate of between about 5% and about 50% catalyst solution volume per second, such as about 5% to 25% catalyst solution volume per second.

In one embodiment, the base is selected from ammonium hydroxide, sodium hydroxide, potassium hydroxide, sodium carbonate, sodium bicarbonate, potassium carbonate, potassium bicarbonate and combinations thereof.

In one embodiment, the non-supercritical drying comprises drying under ambient conditions.

The sol-gel forming composition can further comprise one or more fillers, such as one or more fibers (e.g., quartz, zirconia) and/or one or more powders (e.g., fumed silica or silica powder), which can also include an opacifying powder titania powder).

The dried gel contains at least one macroporous or mesoporous gel, and in some embodiments, further includes a microporous gel cast within the macroporous or mesoporous gel. In one embodiment, the dried hybrid aerogel is ambiently dried or freeze-dried.

In one embodiment, the method comprises forming a sol gel from a sol gel-forming composition comprising combining a first silane solution with a first catalyst solution to form a first catalyst/silane solution; providing the first catalyst/silane solution to a mold or structure; allowing the first catalyst/silane solution to gel and age to form a porous sol combining a second silane solution with a second catalyst solution to form a second catalyst/silane solution; casting the second catalyst/silane solution in place in the structure or mold containing the porous sol gel to form a wet hybrid aerogel. The porous sol gel can be dried porous sol gel or partially dried porous sol gel and further can be open or filled porous sol gel. The method can further comprise drying the wet hybrid aerogel.

Embodiments further comprise a structure comprising a thermal insulator containing a dried porous sol gel made by forming a sol gel from a sol gel-forming composition comprising a silane solution and a catalyst solution; and non-supercritically drying the sol gel to provide a dried porous sol gel having no springback.

In one embodiment, a method is provided comprising providing a dried porous sol gel made by forming a sol gel from a sol gel-forming composition comprising a silane solution and a catalyst solution; and non-supercritically drying the sol gel to provide a dried porous sol gel having no springback; and thermally insulating a structure with the dried porous sol gel.

In one embodiment, a product is providing comprising a microporous silica-based aerogel containing a repeating pattern of substantially spherically-shaped solids which are proximate to one another. The aerogel can be a filled or open porous aerogel and/or a wet or dried porous aerogel.

The resulting silica insulators provide advantages which are surprising and unexpected. For example, some embodiments allow the direct casting of a porous gel around a rigid object, including large or small objects, to form a porous dried porous sol gel that has no cracking or limited cracking, as well as no gap between the porous dried porous sol gel and the solid object or a limited gap. In some embodiments, the gel can be dried using ambient conditions, avoiding the cost and inconvenience of for example, supercritical drying or other drying methods. The method of making the aerogel is far more easily scalable than other methods of making aerogels. The methods described herein are also more efficient and more cost effective on a large scale, primarily as a result of the ability to avoid use of supercritical drying conditions. In some embodiments, the dried porous sol gels can be ambiently dried. In one embodiment, an opaque material can be added, such that the dried porous sol gel can better block certain types of radiation, such as thermal radiation. In some embodiments, the aerogel includes inorganic compounds that can withstand extremely hot or cold temperatures. As a silicon-based aerogel, embodiments of the dried porous sol gel can withstand higher temperatures than organic-based aerogels, such as resorcinol/formaldehyde-based aerogels.

The dried porous sol gels produced herein are useful in many applications, including, but not limited to, next-generation thermoelectric power generation, superconductors, heat engines, such as otto cycle engines (e.g., car engines), diesel cycle engines, brayton cycle engines (e.g., jet turbines), sterling cycle engines (e.g., NASA advance radioisotope sterling generator), rankine cycle engines (e.g., classic steam power plant), microelectronics, including for microelectronics manufacturers interested in channeling heat or thermal isolation, insulation for consumer electronics, biomedicine, cryogenic or low temperature insulation, packaging, aerospace or space insulation, automotive insulation, heavy industry/equipment insulation, home insulation, petrochemical pipeline insulation, and new building construction and retrofits for improved energy efficiency.

This application is intended to cover any adaptations or variations of the present subject matter. For example, although described primarily as ambiently dried sol gels, other non-super critical drying methods can also be used. Additionally, the product and method can be directed to forming a gelled mixture, a wet sol gel, and/or an aged sol gel, which can be further dried in a separate location. Therefore, it is manifestly intended that the embodiments be limited only by the claims and the equivalents thereof.

What is claimed is:

1. A method of forming a sol gel from a sol gel-forming composition comprising:
    forming the sol gel from the sol gel-forming composition, wherein the sol gel-forming composition comprises a silane solution and a catalyst solution, wherein the catalyst solution is added to the silane solution at a rate from about 1% to about 50% catalyst solution per volume per second; and non-supercritically drying the sol gel to provide a dried silicon-based porous sol gel having no springback, wherein the dried silicon-based porous sol gel is cast in place on a structure or preformed using a mold.

2. The method of claim 1 wherein the catalyst solution is added to the silane solution at a rate from about 20% to about 50% catalyst solution volume per second.

3. The method of claim 1 wherein the non-supercritical drying comprises drying under ambient conditions.

4. The method of claim 1 wherein silane in the silane solution has a chemical structure of ASi(OX)(OY)(OZ), wherein A, X, Y, and Z are independently selected from C1-C5 alkyl.

5. The method of claim 3 wherein the silane comprises methyltrimethoxysilane and the silane solution further comprises a silane solution solvent.

6. The method of claim 1 wherein the catalyst solution comprises a base, water, solvent and base.

7. The method of claim 6 wherein the base is selected from ammonium hydroxide, sodium hydroxide, potassium hydroxide, sodium carbonate, sodium bicarbonate, potassium carbonate, potassium bicarbonate and combinations thereof.

8. The method of claim 1 wherein the sol-gel forming composition further comprises a filler.

9. The method of claim 8 wherein the filler is a fiber or powder.

10. The method of claim 9 wherein the fiber is quartz or zirconia.

11. The method of claim 9 wherein the powder is an opacifier.

12. The method of claim 11 wherein the opacifier comprises titania powder.

13. The method of claim 9 wherein the powder is fumed silica or silica powder.

14. The method of claim 1 wherein the dried silicon-based porous sol gel is a dried macroporous or mesoporous sol gel.

15. The method of claim 1 wherein the dried silicon-based porous sol gel is a dried hybrid aerogel.

16. The method of claim 15 wherein the dried hybrid aerogel is ambiently dried or freeze-dried.

17. The method of claim 1 further comprising insulating a structure with the dried silica-based porous sol gel.

18. The method of claim 1 wherein the silica-based sol gel is a microporous silica-based aerogel.

19. The method of claim 1 wherein the dried silicon-based porous sol gel is preformed in the mold and is removed from the mold while still wet or partially wet.

20. A method of forming a sol gel from a sol gel-forming composition comprising:
combining a first silane solution with a first catalyst solution to form a first catalyst/silane solution, wherein the catalyst solution is added to the silane solution at a rate from about 1% to about 50% catalyst solution per volume per second;
providing the first catalyst/silane solution to a mold or structure;
allowing the first catalyst/silane solution to gel and age to form a silicon-based porous sol gel;
combining a second silane solution with a second catalyst solution to form a second catalyst/silane solution, wherein the catalyst solution is added to the silane solution at a rate of from about 1% to about 50% catalyst solution per volume per second;
casting the second catalyst/silane solution in place in the structure or mold containing the silicon-based porous sol gel to form a wet hybrid silicon-based aerogel; and
non-supercritically drying the wet hybrid silicon-based aerogel to produce a dried hybrid silicon-based aerogel having no springback.

21. The method of claim 20 wherein the silicon-based porous sol gel is a dried silicon-based porous sol gel or a partially dried silicon-based porous sol gel.

* * * * *

UNITED STATES PATENT AND TRADEMARK OFFICE
CERTIFICATE OF CORRECTION

PATENT NO. : 9,808,964 B2
APPLICATION NO. : 14/131821
DATED : November 7, 2017
INVENTOR(S) : Jeffrey Sakamoto, Ryan Patrick Maloney and Travis Thompson It is certified that error appears in the above-identified patent and that said Letters Patent is hereby corrected as shown below:

In the Specification

Column 2/Line 47: Error reads as "as cast to thy" and should read as "as cast to dry"
Column 3/Line 15: Error reads as "aerogels, having," and should read as "aerogels having"
Column 9/Line 33: Error reads as "to thy" and should read as "to dry"
Column 9/Line 53: Error reads as "hi some" and should read as "In some"
Column 10/Line 43: Error reads as "vapors the exit" and should read as "vapors that exit"
Column 10/Line 56: Error reads as "20 ruin" and should read as "20 min"
Column 11/Line 20: Error reads as "in a," and should read as "in a"
Column 11/Line 66: Error reads as "As such." and should read as "As such,"
Column 13/Line 56: Error reads as "about 10 wt % to about $0 wt %" and should read as "about 10 wt % to about 40 wt %"
Column 14/Line 6: Error reads as "50 wt of" and should read as "50 wt % of"
Column 15/Line 24: Error reads as "80 wt, or" and should read as "80 wt %, or"
Column 23/Line 31: Error reads as "in ajar" and should read as "in a jar"
Column 23/Lines 32-33: Error reads as "and was labeled sol. In another vial" and should read as "in the jar and was labeled sol. In another vial (jar)"
Column 23/Line 43: Error reads as "m^2/g," and should read as "$m^2/g$"
Column 23/Line 46: Error reads as "m^2/g," and should read as "$m^2/g$"
Column 23/Line 61: Error reads as "The wet mixture 110) was" and should read as "The wet mixture 110 was"
Column 25/Line 4: Error reads as "for 4 Ins." and should read as "for 4 hrs."
Column 25/Line 22: Error reads as "for 4 his" and should read as "for 4 hrs"
Column 25/Line 28: Error reads as "an en ADSG" and should read as "an Open ADSG"
Column 28/Line 6: Error reads as "product is providing comprising" and should read as "product is provided comprising"

Signed and Sealed this
Twenty-sixth Day of June, 2018

Andrei Iancu
*Director of the United States Patent and Trademark Office*

CERTIFICATE OF CORRECTION (continued)
U.S. Pat. No. 9,808,964 B2

In the Claims

Column 29/Lines 17-18/Claim 6: Error reads as "The method of claim 1 wherin the catalyst solution comprises a base, water, solvent and base." and should read as "The method of claim 1 wherein the catalyst solution comprises a base, water and solvent."